US012707085B2

(12) United States Patent
Zhu

(10) Patent No.: US 12,707,085 B2
(45) Date of Patent: Aug. 11, 2026

(54) POINT CLOUD ENCODING AND DECODING METHOD AND APPARATUS, COMPUTER, AND STORAGE MEDIUM

(71) Applicant: TENCENT TECHNOLOGY (SHENZHEN) COMPANY LIMITED, Shenzhen (CN)

(72) Inventor: Wenjie Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 330 days.

(21) Appl. No.: 18/502,591

(22) Filed: Nov. 6, 2023

(65) Prior Publication Data

US 2024/0080478 A1 Mar. 7, 2024

Related U.S. Application Data

(63) Continuation of application No. PCT/CN2022/137564, filed on Dec. 8, 2022.

(30) Foreign Application Priority Data

Mar. 11, 2022 (CN) ........................ 202210243506.X

(51) Int. Cl.
*H04N 19/597* (2014.01)
*H04N 19/18* (2014.01)
*H04N 19/91* (2014.01)

(52) U.S. Cl.
CPC ........... *H04N 19/597* (2014.11); *H04N 19/18* (2014.11); *H04N 19/91* (2014.11)

(58) Field of Classification Search
CPC ...... H04N 19/597; H04N 19/18; H04N 19/91; H04N 19/13; H04N 19/42; H04N 19/60; H04N 19/64; G06T 9/00
See application file for complete search history.

(56) References Cited

U.S. PATENT DOCUMENTS 12,260,600 B2 * 3/2025 Lee .......................... G06T 9/40
2021/0049828 A1 * 2/2021 Park ...................... H04N 19/30
2022/0210466 A1 * 6/2022 Pham Van ........... H04N 19/124

FOREIGN PATENT DOCUMENTS

CN 109993839 A 7/2019
CN 111327902 A 6/2020
(Continued)

OTHER PUBLICATIONS (Kyungjin Lee et al. "Volumetric Video Delivery on Mobile Devices" (Doctoral dissertation, 서울대학교 대학원). Feb. 2020. Retrieved from the Internet. URL: https://s-space.snu.ac.kr/handle/10371/166494.) (Year: 2020).*
(Continued)

*Primary Examiner* — Stephen R Koziol
*Assistant Examiner* — Michael Kim Maiden
(74) *Attorney, Agent, or Firm* — Sughrue Mion, PLLC

(57) ABSTRACT

A point cloud encoding and decoding method including: obtaining encoding limit information that comprises a group quantity limit threshold; obtaining a transform coefficient sequence of point cloud points based on the encoding limit information, where the point cloud points are comprised in a point cloud group that has a quantity less than or equal to the group quantity limit threshold, and where the transform coefficient sequence is obtained by sorting transform coefficients of the point cloud points; and encoding the transform coefficient sequence to obtain a point cloud group bitstream that corresponds to the point cloud group.

18 Claims, 7 Drawing Sheets

(56) References Cited

FOREIGN PATENT DOCUMENTS

| | | | | |
|---|---|---|---|---|
| CN | 113489980 | A | 10/2021 | |
| CN | 115102935 | A | 9/2022 | |
| WO | 2021/034701 | A1 | 2/2021 | |
| WO | 2021/065536 | A1 | 4/2021 | |
| WO | 2021/141352 | A2 | 7/2021 | |
| WO | WO-2022257150 | A1 * | 12/2022 | ............. H04N 19/13 |

OTHER PUBLICATIONS

Extended European Search Report issued Nov. 28, 2024 in European Application No. 22930641.0.
International Search Report for PCT/CN2022/137564 dated Mar. 7, 2023.
Written Opinion for PCT/CN2022/137564 dated Mar. 7, 2023.
Kyungjin Lee et al: "Volumetric video delivery on mobile devices", Department of Electrical Engineering and Computer Science, College of Engineering, Seoul National University, Jan. 1, 2020 (Jan. 1, 2020), pp. 1-61, XP093054033.
Communication Issued Sep. 22, 2025 in European Application No. 22930641.0.

* cited by examiner

POINT CLOUD ENCODING AND DECODING METHOD AND APPARATUS, COMPUTER, AND STORAGE MEDIUM

RELATED APPLICATION

This application is a continuation of PCT/CN2022/137564 filed on Dec. 8, 2022, which claims priority to Chinese Patent Application No. 202210243506.X, entitled "POINT CLOUD ENCODING AND DECODING METHOD AND APPARATUS, COMPUTER, AND STORAGE MEDIUM", filed with the China National Intellectual Property Administration on Mar. 11, 2022, the entireties of both being incorporated herein by reference.

FIELD

The disclosure relates to the field of computer technologies, and in particular, to a point cloud encoding and decoding method and apparatus, a computer, and a storage medium.

BACKGROUND

In an existing point cloud attribute transform and predicting transform methods, all transform coefficients generated by point clouds are uniformly recorded in a very large memory, and then uniformly encoded, which increases memory overheads of encoding and decoding, and may further make an implementation of the process uncontrollable. In addition, uniform encoding of the transform coefficients leads to low efficiency in spatial random access of the point clouds and decoding and reconstruction.

SUMMARY

Embodiments of the disclosure provide a point cloud encoding method and apparatus, a computer, and a storage medium.

According to some embodiments of the disclosure, a point cloud encoding method is provided, and is performed by a computer device. The method may include: obtaining encoding limit information, wherein the encoding limit information may include a group quantity limit threshold; obtaining a transform coefficient sequence of point cloud points based on the encoding limit information, wherein the point cloud points may be comprised in a point cloud group, wherein a quantity of the point cloud groups may be less than or equal to the group quantity limit threshold, and wherein the transform coefficient sequence may be obtained by sorting transform coefficients of the point cloud points; and encoding the transform coefficient sequence to obtain a point cloud group bitstream corresponding to the point cloud group.

According to some embodiments of the disclosure, the encoding limit information may further include a cache limit threshold and a point cloud group size threshold, and the group quantity limit threshold may be obtained based on the cache limit threshold and the point cloud group size threshold.

According to some embodiments of the disclosure, the group quantity limit threshold may be determined based on a grouping manner of point cloud groups, and wherein the grouping manner may include at least one of the following manners: a grouping manner based on a point cloud group size threshold; a grouping manner based on moving sequences obtained through respectively shifting coordinate codewords of k point cloud points, K being a positive integer; or a grouping manner based on a default group quantity.

According to some embodiments of the disclosure, the transform coefficients of the point cloud points may be sorted to obtain the transform coefficient sequence based on an order of the transform coefficients.

According to some embodiments of the disclosure, the transform coefficients of the point cloud points may be sorted to obtain the transform coefficient sequence based on one or more attribute parameters of the point cloud points.

According to some embodiments of the disclosure, the transform coefficient sequence may be encoded to obtain the point cloud group bitstream based on a coefficient residual of a transform coefficient in the transform coefficient sequence.

According to some embodiments of the disclosure, the transform coefficient sequence may be encoded to obtain the point cloud group bitstream using entropy encoding.

According to some embodiments of the disclosure, the transform coefficient sequence may be encoded to obtain the point cloud group bitstream using context-based adaptive binary arithmetic coding.

According to some embodiments of the disclosure, the transform coefficient sequence may be encoded to obtain the point cloud group bitstream based on run lengths in the transform coefficient sequence.

According to some embodiments of the disclosure, the transform coefficient sequence may be encoded to obtain the point cloud group bitstream further based on one of: a cache limit threshold and the group quantity limit threshold; and context models.

According to some embodiments of the disclosure, a point cloud encoding apparatus is provided. The apparatus may include: at least one non-transitory memory containing program code; and at least one processor configured to execute the program code, the program code may include: first obtaining code configured to cause the at least one processor to obtain encoding limit information, wherein the encoding limit information may include a group quantity limit threshold; second obtaining code configured to cause the at least one processor to obtain a transform coefficient sequence of point cloud points based on the encoding limit information, wherein the point cloud points may be comprised in a point cloud group, wherein a quantity of the point cloud groups may be less than or equal to the group quantity limit threshold, and wherein the transform coefficient sequence may be obtained by sorting transform coefficients of the point cloud points; and first encoding code configured to cause the at least one processor to encode the transform coefficient sequence to obtain a point cloud group bitstream corresponding to the point cloud group.

According to some embodiments of the disclosure, the encoding limit information may further include a cache limit threshold and a point cloud group size threshold, and the group quantity limit threshold may be obtained based on the cache limit threshold and the point cloud group size threshold.

According to some embodiments of the disclosure, the group quantity limit threshold may be determined based on a grouping manner of point cloud groups, and wherein the grouping manner may include at least one of the following manners: a grouping manner based on a point cloud group size threshold; a grouping manner based on moving sequences obtained through respectively shifting coordinate codewords of k point cloud points, K being a positive integer; or a grouping manner based on a default group quantity.

According to some embodiments of the disclosure, the transform coefficients of the point cloud points may be sorted to obtain the transform coefficient sequence based on an order of the transform coefficients.

According to some embodiments of the disclosure, the transform coefficients of the point cloud points may be sorted to obtain the transform coefficient sequence based on one or more attribute parameters of the point cloud points.

According to some embodiments of the disclosure, the transform coefficient sequence may be encoded to obtain the point cloud group bitstream based on a coefficient residual of a transform coefficient in the transform coefficient sequence.

According to some embodiments of the disclosure, the transform coefficient sequence may be encoded to obtain the point cloud group bitstream using entropy encoding.

According to some embodiments of the disclosure, the transform coefficient sequence may be encoded to obtain the point cloud group bitstream using context-based adaptive binary arithmetic coding.

According to some embodiments of the disclosure, the transform coefficient sequence may be encoded to obtain the point cloud group bitstream based on run lengths in the transform coefficient sequence.

According to some embodiments of the disclosure, a non-transitory computer-readable medium for point cloud encoding is provided. The non-transitory computer-readable medium may contain program code that when executed by at least one processor, causes the at least one processor to: obtain encoding limit information, wherein the encoding limit information may include a group quantity limit threshold; obtain a transform coefficient sequence of point cloud points based on the encoding limit information, wherein the point cloud points may be comprised in a point cloud group, wherein a quantity of the point cloud groups may be less than or equal to the group quantity limit threshold, and wherein the transform coefficient sequence may be obtained by sorting transform coefficients of the point cloud points; and encode the transform coefficient sequence to obtain a point cloud group bitstream corresponding to the point cloud group.

Details of one or more embodiments of the disclosure are provided in the accompany drawings and descriptions below. Other features, objectives, and advantages of the disclosure will become obvious with reference to the specification, the accompanying drawings, and the claims.

BRIEF DESCRIPTION OF THE DRAWINGS

To describe the technical solutions of the embodiments of the disclosure or the related art more clearly, the following accompanying drawings are used. The accompanying drawings in the following description show only some embodiments of the disclosure, and a person of ordinary skill in the art may still derive other embodiments from these accompanying drawings and the related descriptions.

DETAILED DESCRIPTION

The technical solutions in the embodiments of the disclosure are described below with reference to the accompanying drawings in the embodiments of the disclosure. The described embodiments are merely some rather than all of the embodiments of the disclosure. All other embodiments obtained by a person of ordinary skill in the art based on the embodiments of the disclosure without creative efforts shall fall within the protection scope of the disclosure.

The disclosure relates to the field of big data. Big data may refer to a collection of data that cannot be captured, managed and processed within a certain time range using conventional software tools. Big data may also refer to a massive, high-growth and diversified information asset that requires a new processing model in order to achieve stronger decision-making power, insight discovery, and process optimization capabilities. With the advent of cloud era, the big data has also attracted more and more attention. The big data may require special technologies to effectively process large amounts of data within tolerable time. Technologies applicable to the big data may include massively parallel processing of database, data mining, a distributed file system, a distributed database, a cloud computing platform, the Internet, and a scalable storage system. For example, a big data processing technology, a data computing technology, and the like in the field of big data may be used to encode and decode point clouds and the like to improve efficiency of data processing.

Figures 1, 2:
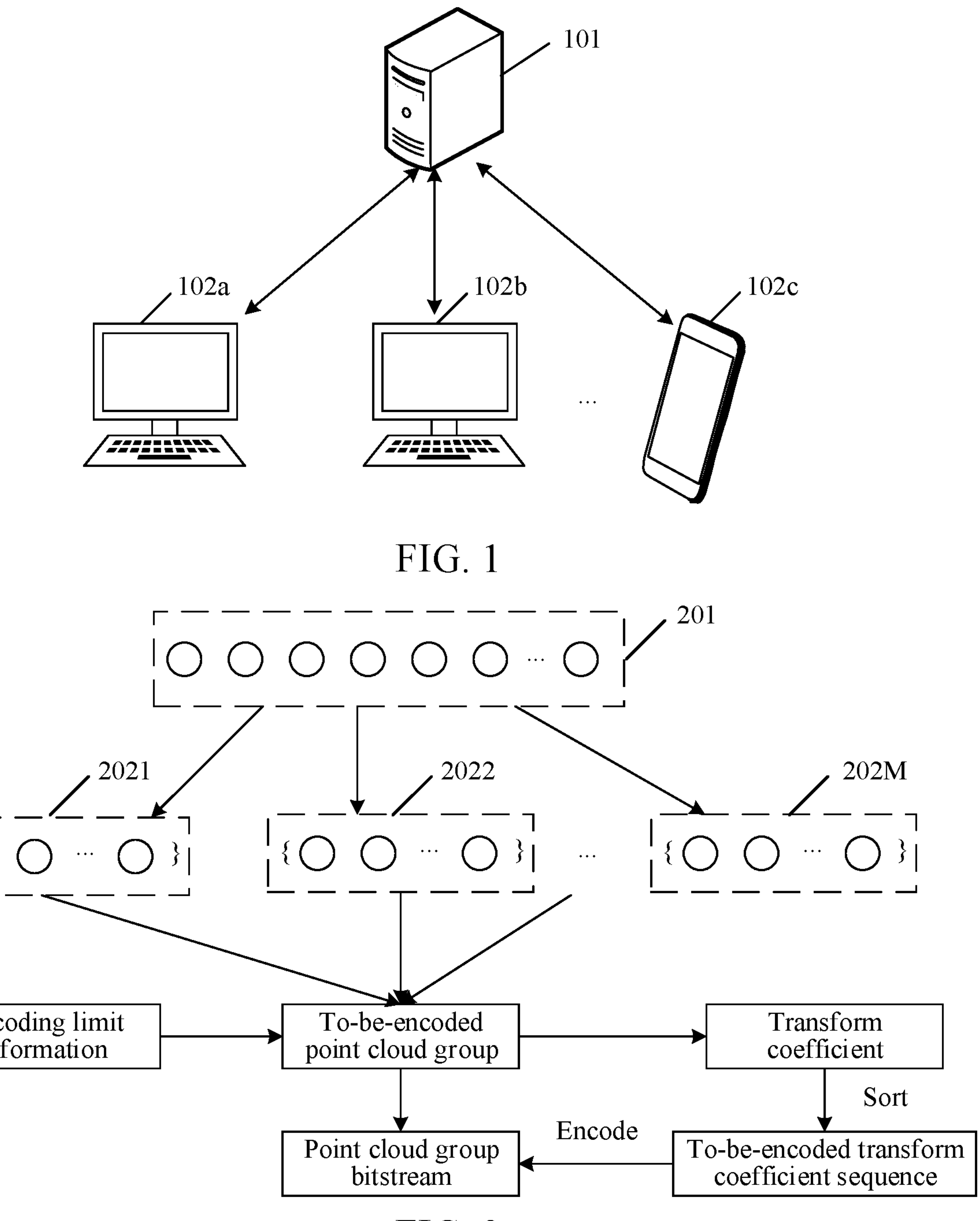
FIG. 1 is an architecture diagram of network interaction involved in point cloud encoding and decoding processing according to some embodiments of the disclosure.
FIG. 2 is a schematic diagram of a scenario of point cloud encoding according to some embodiments of the disclosure.

In the embodiments of the disclosure, FIG. 1 is an architecture diagram of network interaction involved in point cloud encoding and decoding processing according to some embodiments of the disclosure. A computer device 101 may obtain point cloud points that need to be encoded from the computer device 101, and encode the obtained point cloud points; or obtain a bitstream that needs to be decoded from the computer device 101, and decode the obtained bitstream. Alternatively, the computer device 101 may obtain point cloud points that need to be encoded from another associated device, and encode the obtained point cloud points; or obtain a bitstream that needs to be decoded from the associated device, and decode the obtained bitstream. A quantity of associated devices may be one or at least two. For example, as shown in FIG. 1, the quantity of associated devices may be 3, and may include an associated device 102*a*, an associated device 102*b*, or an associated device 102*c*.

FIG. 2 is a schematic diagram of a scenario of point cloud encoding according to some embodiments of the disclosure. As shown in FIG. 2, the computer device may obtain k point cloud points 201, and perform group processing on the k point cloud points 201 to obtain M point cloud groups, where M is a positive integer and k is a positive integer. For example, it is assumed that M is 2. In this case, the M point cloud groups may include a point cloud group 1, a point cloud group 2, and the like. In another example, as shown in FIG. 2, it is assumed that M is greater than or equal to 3. In this case, the M point cloud groups may include a point cloud group 2021, a point cloud group 2022, a point cloud group 202M, and the like as shown in FIG. 2. In some embodiments, the computer device may obtain encoding limit information. The encoding limit information may include a group quantity limit threshold. In some embodiments, the computer device may obtain a to-be-encoded point cloud group from the M point cloud groups based on the encoding limit information, where a quantity of to-be-encoded point cloud groups is less than or equal to the group quantity limit threshold. Further, the computer device may perform point cloud prediction processing on a to-be-encoded point cloud group to obtain transform coefficients of to-be-encoded point cloud points included in the to-be-encoded point cloud group. Subsequently, the computer device may sort the transform coefficients of the to-be-encoded point cloud points included in the to-be-encoded point cloud group to obtain a to-be-encoded transform coefficient sequence. Further, the to-be-encoded transform coefficient sequence may be encoded to obtain a point cloud group bitstream corresponding to the to-be-encoded point cloud group. For example, it is assumed that M is 8, the M point cloud groups include a point cloud group 1, a point cloud group 2, a point cloud group 3, . . . and a point cloud group 8, and the group quantity limit threshold is 3. In this case, (the point cloud group 1, the point cloud group 2, and the point cloud group 3) are used as one to-be-encoded point cloud group, (the point cloud group 4, the point cloud group 5, and the point cloud group 6) are used as one to-be-encoded point cloud group, and (the point cloud group 7 and the point cloud group 8) are used as one to-be-encoded point cloud group. A quantity of point cloud groups processed in one encoding may be limited through encoding limit information, so that spatial random access of point clouds can be achieved, and partial point cloud decoding and reconstruction can be achieved, thereby improving fault tolerance of encoding and decoding, and improving encoding and decoding performance and efficiency.

It may be understood that the associated device mentioned in the embodiments of the disclosure may be a computer device, and the computer device in the embodiments of the disclosure includes but is not limited to a terminal device or a server. In other words, the computer device may be a server or a terminal device, or may be a system including a server and a terminal device. The terminal device mentioned above may be an electronic device, including but is not limited to a mobile phone, a tablet computer, a desktop computer, a notebook computer, a palmtop computer, an in-vehicle device, an augmented reality/virtual reality (AR/VR) device, a helmet-mounted display, a smart TV, a wearable device, a smart speaker, a digital camera, a camera, and another mobile internet device (MID) having a network access capability, or a terminal device in scenarios such as a train, a ship, and a flight. The server mentioned above may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a vehicle-road collaboration, a content delivery network (CDN), big data, and an artificial intelligence platform.

In some embodiments, data involved in the embodiments of the disclosure may be stored in a computer device, or data may be stored based on a cloud storage technology or a block chain technology. This is not limited herein.

Figure 3:
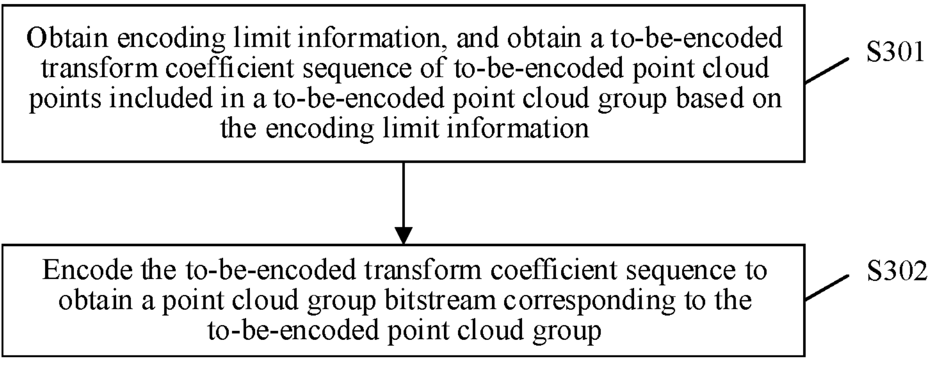
FIG. 3 is a flowchart of a point cloud encoding method according to some embodiments of the disclosure.

FIG. 3 is a flowchart of a point cloud encoding method according to some embodiments of the disclosure. As shown in FIG. 3, a point cloud encoding process may include the following operations:

Operation S301. Obtain encoding limit information, and obtain a to-be-encoded transform coefficient sequence of to-be-encoded point cloud points included in a to-be-encoded point cloud group based on the encoding limit information.

In the embodiments of the disclosure, the encoding limit information may include a group quantity limit threshold, wherein a quantity of to-be-encoded point cloud groups may be less than or equal to the group quantity limit threshold, and the to-be-encoded transform coefficient sequence may be obtained by sorting transform coefficients of the to-be-encoded point cloud points included in the to-be-encoded point cloud group. The group quantity limit threshold may be denoted as maxGroup. Specifically, a computer device may obtain k point cloud points, and perform group processing on the k point cloud points to obtain M point cloud groups, where a point cloud group that currently needs to be encoded may be obtained based on the encoding limit information. The obtained point cloud group that currently needs to be encoded may be denoted as a to-be-encoded point cloud group, and a quantity of to-be-encoded point cloud groups may be less than or equal to the group quantity limit threshold. For example, it is assumed that M is 14, that is, there are 14 point cloud groups, and it is assumed that the group quantity limit threshold is 4. In this case, a first point cloud group to a fourth point cloud group may be determined as to-be-encoded point cloud groups, and the to-be-encoded point cloud groups are encoded; then, a fifth point cloud group to an eighth point cloud group may be determined as to-be-encoded point cloud groups, and the to-be-encoded point cloud groups are encoded; then, a ninth point cloud group to a twelfth point cloud group may be determined as to-be-encoded point cloud groups, and the to-be-encoded point cloud groups are encoded; and then, a thirteenth point cloud group to a fourteenth point cloud group may be determined as to-be-encoded point cloud groups, and the to-be-encoded point cloud groups are encoded. In some embodiments, the computer device may ensure, when ensuring that a quantity of to-be-encoded point cloud groups included in each to-be-encoded point cloud group is less than or equal to the group quantity limit threshold, that the quantity of to-be-encoded point cloud groups included in each to-be-encoded point cloud group is approximate as much as possible.

Further, the computer device may obtain the transform coefficients of the to-be-encoded point cloud points included in the to-be-encoded point cloud group, and sort the transform coefficients of the to-be-encoded point cloud points included in the to-be-encoded point cloud group to obtain the to-be-encoded transform coefficient sequence corresponding to the to-be-encoded point cloud group. In some embodiments, the computer device may obtain attribute predicted values of the to-be-encoded point cloud points included in the to-be-encoded point cloud group, determine attribute residuals of the to-be-encoded point cloud points included in the to-be-encoded point cloud group based on the attribute predicted values, and covert the attribute residuals of the to-be-encoded point cloud points included in the to-be-encoded point cloud group to obtain a transform coefficient corresponding to each to-be-encoded point cloud group, where the transform coefficient corresponding to each to-be-encoded point cloud group may include transform coefficients of the to-be-encoded point cloud points included in the to-be-encoded point cloud group.

The encoding limit information may further include a cache limit threshold and a point cloud group size threshold, where the group quantity limit threshold may be obtained based on the cache limit threshold and the point cloud group size threshold. The cache limit threshold may be denoted as maxBuff, and the point cloud group size threshold may be denoted as maxSize. When any two parameters of the group quantity limit threshold, the cache limit threshold, and the point cloud group size threshold are obtained, the remaining parameter may be obtained. For example, it may be considered that the cache limit threshold=the group quantity limit threshold*the point cloud group size threshold. As such, for example, the group quantity limit threshold may be directly obtained, or may be obtained based on the cache limit threshold and the point cloud group size threshold.

In the foregoing embodiment where the encoding limit information further includes the cache limit threshold and the point cloud group size threshold, the encoding and decoding efficiency can be further improved.

The encoding limit information may be a default parameter value. For example, if any two parameters in the encoding limit information are known, a last parameter may be obtained. For example, based on maxBuff=256 and maxSize=8, maxGroup=32. The encoding limit information may further be a received input parameter value. For example, based on obtained input parameter values being maxBuff=256 and maxSize=8, maxGroup=32.

Alternatively, the group quantity limit threshold may be determined based on a grouping manner of point cloud groups. The grouping manner may include: a grouping manner based on a point cloud group size threshold; or a grouping manner based on moving sequences obtained through respectively shifting coordinate codewords of k point cloud points, K being a positive integer; or a grouping manner based on a default group quantity. Specifically, the computer device may obtain a point cloud grouping manner of the M point cloud groups, and obtain a group quantity limit threshold corresponding to the point cloud grouping manner.

In the foregoing embodiments, flexibility of grouping can be improved by providing a variety of grouping manners for the to-be-encoded point cloud group.

Further, the computer device may obtain the transform coefficient corresponding to the to-be-encoded point cloud group, and perform sorting processing on the transform coefficient of the to-be-encoded point cloud group to obtain a to-be-encoded transform coefficient sequence.

A first transform coefficient may be denoted as DC, and a second transform coefficient may be denoted as AC.

In some embodiments of the disclosure, the transform coefficients of the to-be-encoded point cloud points may be sorted to obtain the transform coefficient sequence based on an order of the transform coefficients.

In Coefficient sorting manner 1, the transform coefficients of the to-be-encoded point cloud points included in the to-be-encoded point cloud group may include a first transform coefficient and a second transform coefficient. The to-be-encoded transform coefficient sequence may include a first coefficient subsequence and a second coefficient subsequence; a transform coefficient included in the first coefficient subsequence may be the first transform coefficient and may be consecutive in the transform coefficient sequence; and a transform coefficient included in the second coefficient subsequence may be the second transform coefficient and may be consecutive in the transform coefficient sequence. In other words, the computer device may adjoin first transform coefficients included in to-be-encoded point cloud groups in sequence, and adjoin second transform coefficients included in the to-be-encoded point cloud groups in sequence, to obtain the to-be-encoded transform coefficient sequence. In some embodiments, a sequence including the first transform coefficients in the to-be-encoded transform coefficient sequence may be denoted as the first coefficient subsequence, and a sequence including the second transform coefficients in the to-be-encoded transform coefficient sequence may be denoted as the second coefficient subsequence. In some embodiments, in a to-be-encoded transform coefficient sequence, relative positions of a first coefficient subsequence and a second coefficient subsequence are not limited. For example, the to-be-encoded transform coefficient sequence may be [the first coefficient subsequence, the second coefficient subsequence], or may be [the second coefficient subsequence, the first coefficient subsequence].

In the foregoing embodiment, where the transform coefficients include the first transform coefficient and the second transform coefficient, where the transform coefficient included in the first coefficient subsequence is the first transform coefficient and is consecutive in the transform coefficient sequence, and where the transform coefficient included in the second coefficient subsequence is the second transform coefficient and is consecutive in the transform coefficient sequence, encoding and decoding efficiency can be further improved.

For example, for attribute parameters having a single attribute component, attribute parameters, such as reflectivity attribute parameters, may be sorted in Coefficient sorting manner 1. After the transform coefficients are sorted, the obtained to-be-encoded transform coefficient sequence may be $[DC_1, \ldots DC_{F1}, \{AC_1\}, \ldots, \{AC_{F2}\}]$; or the to-be-encoded transform coefficient sequence may be $[\{AC_1\}, \ldots, \{AC_{F2}\}, DC_1, \ldots DC_{F1}]$. A quantity of first transform coefficients may be denoted as $F_1$, and a quantity of second transform coefficients may be denoted as $F_2$. Both $F_1$ and $F_2$ are positive integers.

In Coefficient sorting manner 2, the transform coefficients of the to-be-encoded point cloud points included in the to-be-encoded point cloud group may include a first transform coefficient and a second transform coefficient; and a transform coefficient adjacent to the first transform coefficient in the to-be-encoded transform coefficient sequence may be the second transform coefficient, and a transform coefficient adjacent to the second transform coefficient in the to-be-encoded transform coefficient sequence may be the first transform coefficient. In other words, the first transform coefficient and the second transform coefficient in the obtained transform coefficient of the to-be-encoded point cloud group may be cross-sorted, where an order of the first transform coefficient and the second transform coefficient is not limited.

For example, for attribute parameters having a single attribute component where Coefficient sorting manner 2 is used for sorting, the obtained to-be-encoded transform coefficient sequence may be [DC, {AC}, . . . , DC, {AC}]; or the to-be-encoded transform coefficient sequence may be [{AC}, DC, . . . , {AC}, DC].

In the foregoing embodiment, where the transform coefficient includes the first transform coefficient and the second transform coefficient, where the transform coefficient adjacent to the first transform coefficient in the to-be-encoded transform coefficient sequence is the second transform coefficient, and where the transform coefficient adjacent to the second transform coefficient in the to-be-encoded transform coefficient sequence is the first transform coefficient, encoding and decoding efficiency can be further improved.

In some embodiments, in transform coefficients of to-be-encoded point cloud points included in a to-be-encoded point cloud group, a quantity of first transform coefficients and a quantity of second transform coefficients may be different. For example, when binary tree coefficients are predicted group by group, one to-be-encoded point cloud group may include one first transform coefficient and at least two second transform coefficients. In this case, in a to-be-encoded transform coefficient sequence, transform coefficients corresponding to the same to-be-encoded point cloud group may be consecutive. For example, the to-be-encoded transform coefficient sequence may be [DC, {AC}, {AC}, . . . , DC, {AC}, . . . , {AC}], where [DC, {AC}, {AC}, . . . ] may be used for representing transform coefficients corresponding to a to-be-encoded point cloud group; or the to-be-encoded transform coefficient sequence may be [{AC}, . . . , {AC}, DC, {AC}, . . . , {AC}, DC, . . . , DC], where [{AC}, . . . , {AC}, DC] may be used for representing transform coefficients corresponding to a to-be-encoded point cloud group. In some embodiments, in the to-be-encoded transform coefficient sequence, an order of transform coefficients may be the same as an order of to-be-encoded point cloud points in the to-be-encoded point cloud group. For example, for (a first to-be-encoded point cloud point, a second to-be-encoded point cloud point, a third to-be-encoded point cloud point), obtained to-be-encoded transform coefficients may be (a transform coefficient of the first to-be-encoded point cloud point, a transform coefficient of the second to-be-encoded point cloud point, a transform coefficient of the third to-be-encoded point cloud point).

In some embodiments of the disclosure, the transform coefficients of the to-be-encoded point cloud points may be sorted to obtain the transform coefficient sequence based on one or more attribute parameters of the point cloud points.

In Coefficient sorting manner 3, an attribute parameter of the to-be-encoded point cloud points included in the to-be-encoded point cloud group may include b attribute components, b being a positive integer; the transform coefficients of the to-be-encoded point cloud points may include first transform coefficients corresponding to the b attribute components of the to-be-encoded point cloud points, and second transform coefficients corresponding to the b attribute components; and the to-be-encoded transform coefficient sequence may include coefficient subsequences corresponding to the b attribute components, a coefficient subsequence including a first transform coefficient and a second transform coefficient of a corresponding attribute component. In other words, the computer device may independently sort transform coefficients corresponding to attribute components, to obtain the to-be-encoded transform coefficient sequence. In some embodiments, in this way, a coefficient subsequence corresponding to each attribute component may be sorted by using Coefficient sorting manner 1 or Coefficient sorting manner 2. In other words, in this manner, the coefficient subsequence corresponding to each attribute component is equivalent to a to-be-encoded transform coefficient sequence corresponding to a single attribute component.

For example, Coefficient sorting manner 3 may be used for sorting an attribute parameter having a plurality of attribute components, such as a color attribute parameter, for example, a YUV color attribute parameter or a red green blue (RGB) color attribute parameter. For example, a YUV color attribute parameter includes y attribute components, u attribute components, and v attribute components, and the to-be-encoded transform coefficient sequence may be [$DC_{1y}$, . . . , $DC_{F1y}$, {$AC_{1y}$}, . . . , {$AC_{F2y}$}, $DC_{1u}$, . . . , $DC_{F1u}$, {$AC_{1u}$}, . . . , {$AC_{F2u}$}, $DC_{1v}$, . . . , $DC_{F1v}$, {$AC_{1v}$}, {$AC_{F2v}$}]. In this case, [$DC_{1y}$, . . . , $DC_{F1y}$, {$AC_{1y}$}, . . . , {$AC_{F2y}$}] may be a coefficient subsequence corresponding to the y attribute components, [$DC_{1u}$, . . . , $DC_{F1u}$, {$AC_{1u}$}, . . . , {$AC_{F2u}$}] may be a coefficient subsequence corresponding to the u attribute components, and [$DC_{1v}$, . . . , $DC_{F1v}$, {$AC_{1v}$}, . . . , {$AC_{F2v}$}] may be a coefficient subsequence corresponding to the v attribute components. Alternatively, the to-be-encoded transform coefficient sequence may be [{$AC_{1y}$}, . . . {$AC_{F2y}$}, $DC_{1y}$, . . . , $DC_{F1y}$, {$AC_{1u}$}, . . . , {$AC_{F2u}$}, $DC_{1u}$, . . . , $DC_{F1u}$, {$AC_{1v}$}, . . . , {$AC_{F2v}$}, $DC_{1v}$, . . . , $DC_{F1v}$]. Alternatively, the to-be-encoded transform coefficient sequence may be [{$AC_y$}, $DC_y$, . . . , {$AC_y$}, $DC_y$, {$AC_u$}, $DC_u$, . . . , {$AC_u$}, $DC_u$, {$AC_v$}, $DC_v$, . . . , {$AC_v$}, $DC_v$]. Alternatively, the to-be-encoded transform coefficient sequence may be [$DC_y$, {$AC_y$}, . . . , $DC_y$, {$AC_y$}, $DC_u$, {$AC_u$}, . . . , $DC_u$, {$AC_u$}, $DC_v$, {$AC_v$}, . . . , $DC_v$, {$AC_v$}] or the like. A subscript y may be used for representing transform coefficients under the y attribute components, a subscript u may be used for representing transform coefficients under the u attribute components, and a subscript v may be used for representing transform coefficients under the v attribute components.

In the foregoing embodiment, where the to-be-encoded transform coefficient sequence includes the coefficient subsequences corresponding to the b attribute components, and where the coefficient subsequence includes the first transform coefficient and the second transform coefficient of the corresponding attribute component, encoding and decoding efficiency can be further improved.

In Coefficient sorting manner 4, an attribute parameter of the to-be-encoded point cloud points included in the to-be-encoded point cloud group may include b attribute components, b being a positive integer; and the transform coefficients of the to-be-encoded point cloud points may include first transform coefficients corresponding to the b attribute components of the to-be-encoded point cloud points, and second transform coefficients corresponding to the b attribute components, the first transform coefficients corresponding to the b attribute components may be consecutive in the to-be-encoded transform coefficient sequence, and the second transform coefficients corresponding to the b attribute components may be consecutive in the to-be-encoded transform coefficient sequence. In other words, the computer device may make the first transform coefficients in the transform coefficients of the to-be-encoded point cloud points included in the to-be-encoded point cloud group adjacent in sequence, and make the second transform coefficients adjacent in sequence to obtain the to-be-encoded transform coefficient sequence.

For example, using a YUV color attribute parameter as an example, the to-be-encoded transform coefficient sequence may be [$DC_{1y}$, $DC_{1u}$, $DC_{1v}$, . . . , $DC_{F1y}$, $DC_{F1u}$, $DC_{F1v}$, $\{AC_{1y}\}$, $\{AC_{1u}\}$, $\{AC_{1v}\}$, . . . , $\{AC_{F2y}\}$, $\{AC_{F2u}\}$, $\{AC_{F2v}\}$]. Alternatively, the to-be-encoded transform coefficient sequence may be [$\{AC_{1y}\}$, $\{AC_{1u}\}$, $\{AC_{1v}\}$, . . . , $\{AC_{F2y}\}$, $\{AC_{F2u}\}$, $\{AC_{F2v}\}$, $DC_{1y}$, $DC_{1u}$, $DC_{1v}$, . . . , $DC_{F1y}$, $DC_{F1u}$, $DC_{F1v}$] or the like.

In the foregoing embodiment, where the first transform coefficients corresponding to the b attribute components are consecutive in the to-be-encoded transform coefficient sequence, and the second transform coefficients corresponding to the b attribute components are consecutive in the to-be-encoded transform coefficient sequence, so that encoding and decoding efficiency can be further improved.

In Coefficient sorting manner 5, an attribute parameter of the to-be-encoded point cloud points included in the to-be-encoded point cloud group may include b attribute components, b being a positive integer; and the transform coefficients of the to-be-encoded point cloud points may include first transform coefficients corresponding to the b attribute components of the to-be-encoded point cloud points, and second transform coefficients corresponding to the b attribute components. The corresponding transform coefficients under the same quantity of coefficient bits may be consecutive, and a quantity of coefficient bits may be used for representing associated positions of indicated transform coefficient in the to-be-encoded point cloud points included in the to-be-encoded point cloud group. Using a YUV color attribute parameter as an example, the to-be-encoded transform coefficient sequence may be [$DC_y$, $DC_u$, $DC_v$, $\{AC_y\}$, $\{AC_u\}$, $\{AC_v\}$, . . . , $DC_y$, $DC_u$, $DC_v$, $\{AC_y\}$, $\{AC_u\}$, $\{AC_v\}$] or the like. Certainly, the first transform coefficient and the second transform coefficient may exchange positions. For example, the to-be-encoded transform coefficient sequence may be [$\{AC_y\}$, $\{AC_u\}$, $\{AC_y\}$, $DC_y$, $DC_u$, $DC_v$, . . . , $\{AC_y\}$, $\{AC_u\}$, $\{AC_y\}$, $DC_y$, $DC_u$, $DC_v$] or the like.

In Coefficient sorting manner 6, an attribute parameter of the to-be-encoded point cloud points included in the to-be-encoded point cloud group may include b attribute components, b being a positive integer; and the transform coefficients of the to-be-encoded point cloud points may include first transform coefficients corresponding to the b attribute components of the to-be-encoded point cloud points, and second transform coefficients corresponding to the b attribute components. The to-be-encoded transform coefficient sequence may include a first hybrid subsequence and a second hybrid subsequence. The first hybrid subsequence may include the first transform coefficients corresponding to the b attribute components of the to-be-encoded point cloud points. The first transform coefficients of associated attribute components of a same to-be-encoded point cloud point in the first hybrid subsequence may be adjacent, where the associated attribute components being at least two attribute components whose similarities are greater than a component similarity threshold, or at least two attribute components that are associated by default. The first transform coefficients of remaining attribute components of different to-be-encoded point cloud points in the first hybrid subsequence may be consecutive, where the remaining attribute components being attribute components other than the associated attribute components in the b attribute components. The second hybrid subsequence may include the second transform coefficients corresponding to the b attribute components of the to-be-encoded point cloud points, where second transform coefficients of the b attribute components of a same to-be-encoded point cloud point in the second hybrid subsequence may be adjacent in sequence. For example, in a YUV color attribute parameter, u attribute components and v attribute components are two attribute components that are associated by default. In other words, under the attribute parameter, first transform coefficients of the u attribute components of a same to-be-encoded point cloud point in the first hybrid subsequence are adjacent to first transform coefficients of the v attribute components.

For example, using a YUV color attribute parameter as an example, the to-be-encoded transform coefficient sequence may be [$DC_{1y}$, . . . , $DC_{F1y}$, $DC_{1u}$, $DC_{1v}$, . . . , $DC_{F1u}$, $DC_{F1v}$, $\{AC_{1y}\}$, $\{AC_{1u}\}$, $\{AC_{1v}\}$, . . . , $\{AC_{F2y}\}$, $\{AC_{F2u}\}$, $\{AC_{F2v}\}$]. Alternatively, the to-be-encoded transform coefficient sequence may be [$\{AC_{1y}\}$, $\{AC_{1u}\}$, $\{AC_{1v}\}$, . . . , $\{AC_{F2y}\}$, $\{AC_{F2u}\}$, $\{AC_{F2v}\}$, $DC_{1y}$, . . . , $DC_{F1y}$, $DC_{1u}$, $DC_{1v}$, . . . , $DC_{F1u}$, $DC_{F1v}$] or the like. [$DC_{1y}$, . . . , $DC_{F1y}$, $DC_{1u}$, $DC_{1v}$, . . . , $DC_{F1u}$, $DC_{F1v}$] may be used for representing the first hybrid subsequence; and [$\{AC_{1y}\}$, $\{AC_{1u}\}$, $\{AC_{1v}\}$, . . . , $\{AC_{F2y}\}$, $\{AC_{F2u}\}$, $\{AC_{F2v}\}$] may be used for representing the second hybrid subsequence.

In the foregoing embodiment, where the to-be-encoded transform coefficient sequence includes the first hybrid subsequence and the second hybrid subsequence with corresponding characteristics of the first hybrid subsequence and the second hybrid subsequence being correspondingly limited, encoding and decoding efficiency can be further improved.

In a Coefficient sorting manner 7, an attribute parameter of the to-be-encoded point cloud points included in the to-be-encoded point cloud group may include b attribute components, b being a positive integer; and the transform coefficients of the to-be-encoded point cloud points may include first transform coefficients corresponding to the b attribute components of the to-be-encoded point cloud points, and second transform coefficients corresponding to the b attribute components. The to-be-encoded transform coefficient sequence may include a third hybrid subsequence and a fourth hybrid subsequence. The third hybrid subsequence may include the first transform coefficients corresponding to the b attribute components of the to-be-encoded point cloud points. The first transform coefficients of associated attribute components of a same to-be-encoded point cloud point in the third hybrid subsequence may be adjacent, where the associated attribute components may be at least two attribute components whose similarities are greater than a component similarity threshold. The first transform coefficients of remaining attribute components of different to-be-encoded point cloud points in the third hybrid subsequence may be consecutive, where the remaining attribute components may be attribute components other than the associated attribute components in the b attribute components. The the fourth hybrid subsequence may include the second transform coefficients corresponding to the b attribute components of the to-be-encoded point cloud points, where second transform coefficients of associated attribute components of a same to-be-encoded point cloud point in the fourth hybrid subsequence may be adjacent, and second transform coefficients of remaining attribute components of different to-be-encoded point cloud points in the fourth hybrid subsequence may be consecutive. For example, in a YUV color attribute parameter, u attribute components and v attribute components are two attribute components that are associated by default. In other words, under the attribute parameter, first transform coefficients of the u attribute components of a same to-be-encoded point cloud point in the third hybrid subsequence are adjacent to first transform coefficients of the v attribute components; and second transform coefficients of the u attribute components of a same to-be-encoded point cloud point in the fourth hybrid subsequence are adjacent to second transform coefficients of the v attribute components.

For example, using a YUV color attribute parameter as an example, the to-be-encoded transform coefficient sequence may be [$DC_{1y}$, . . . , $DC_{F1y}$, $DC_{1u}$, $DC_{1v}$, . . . , $DC_{F1u}$, $DC_{F1v}$, {$AC_{1y}$}, . . . , {$AC_{F2y}$}, {$AC_{1u}$}, {$AC_{1v}$}, . . . , {$AC_{F2u}$}, {$AC_{F2v}$}]. Alternatively, the to-be-encoded transform coefficient sequence may be [{$AC_{1y}$}, . . . , {$AC_{F2y}$}, {$AC_{1u}$}, {$AC_{1v}$}, . . . , {$AC_{F2u}$}, {$AC_{F2v}$}, $DC_{1y}$, . . . , $DC_{F1y}$, $DC_{1u}$, $DC_{1v}$, . . . , $DC_{F1u}$, $DC_{F1v}$]. [$DC_{1y}$, . . . , $DC_{F1y}$, $DC_{1u}$, $DC_{1v}$, . . . , $DC_{F1u}$, $DC_{F1v}$] may be used for representing the third hybrid subsequence, and [{$AC_{1y}$}, . . . {$AC_{F2y}$}, {$AC_{1u}$}, {$AC_{1v}$}, . . . , {$AC_{F2u}$}, {$AC_{F2v}$}] may be used for representing the fourth hybrid subsequence.

In the foregoing embodiment, where the to-be-encoded transform coefficient sequence includes the third hybrid subsequence and the fourth hybrid subsequence with corresponding characteristics of the third hybrid subsequence and the fourth hybrid subsequence being correspondingly limited, encoding and decoding efficiency can be further improved.

In a Coefficient sorting manner 8, the to-be-encoded point cloud points included in the to-be-encoded point cloud group may include at least two attribute parameters; and the transform coefficients of the to-be-encoded point cloud points included in the to-be-encoded point cloud group may include first transform coefficients of the at least two attribute parameters, and second transform coefficients of the at least two attribute parameters. In the to-be-encoded transform coefficient sequence, a first transform coefficient and a second transform coefficient parameter under a same attribute may be consecutive, first transform coefficients under different attribute parameters may be inconsecutive, and second transform coefficients under the different attribute parameters may be inconsecutive. In other words, the computer device may sort the transform coefficients of the to-be-encoded point cloud points included in the to-be-encoded point cloud group based on the at least two attribute parameters. The transform coefficient corresponding to each attribute parameter may be sorted by using the foregoing coefficient sorting manners. For example, the obtained to-be-encoded transform coefficient sequence may be [a transform coefficient corresponding to an attribute parameter 1, a transform coefficient corresponding to an attribute parameter 2, . . . ]. Specifically, it may be considered that the to-be-encoded transform coefficient sequence includes parameter subsequences corresponding to the at least two attribute parameters, that is, it may be represented as [a parameter subsequence 1, a parameter subsequence 2, . . . ]. Each parameter subsequence may be obtained by using any coefficient sorting manner in Coefficient sorting manner 1 to Coefficient sorting manner 7 mentioned above. Each parameter subsequence is obtained by sorting transform coefficients (including the first transform coefficients and the second transform coefficients) of the attribute parameters corresponding to the parameter subsequence.

In the foregoing embodiment, where in the to-be-encoded transform coefficient sequence, the first transform coefficient and the second transform coefficient parameter under the same attribute are consecutive, the first transform coefficients under different attribute parameters are inconsecutive, and the second transform coefficients under the different attribute parameters are inconsecutive, encoding and decoding efficiency can be further improved.

In Coefficient sorting manner 9, the to-be-encoded point cloud points included in the to-be-encoded point cloud group may include at least two attribute parameters; and the transform coefficients of the to-be-encoded point cloud points included in the to-be-encoded point cloud group may include first transform coefficients of the at least two attribute parameters, and second transform coefficients of the at least two attribute parameters. In the to-be-encoded transform coefficient sequence, the first transform coefficients corresponding to the at least two attribute parameters may be consecutive, and the second transform coefficients corresponding to the at least two attribute parameters may be consecutive. In other words, it may be considered that all the first transform coefficients in the transform coefficients of to-be-encoded point cloud points included in the to-be-encoded point cloud group may be sorted adjacently in sequence, and all the second transform coefficients in the transform coefficients of the to-be-encoded point cloud points included in the to-be-encoded point cloud group may be sorted adjacently in sequence to obtain the to-be-encoded transform coefficient sequence.

Operation S302. Encode the to-be-encoded transform coefficient sequence to obtain a point cloud group bitstream corresponding to the to-be-encoded point cloud group.

In the embodiments of the disclosure, it may be considered that the to-be-encoded transform coefficient sequence may include F transform coefficients. The F transform coefficients may include $F_1$ first transform coefficients and $F_2$ second transform coefficients, F being a positive integer, $F_1$ being a positive integer less than or equal to F, and $F_2$ being a positive integer less than or equal to F.

In some embodiments of the disclosure, the transform coefficient sequence may be encoded to obtain the point cloud group bitstream based on a coefficient residual of a transform coefficient in the transform coefficient sequence.

In Encoding method (1), in a case that an $i^{th}$ transform coefficient in the F transform coefficients is a second transform coefficient, encoding processing may be performed on the $i^{th}$ transform coefficient to obtain an encoded codeword of the $i^{th}$ transform coefficient, i being a positive integer less than or equal to F. In a case that the $i^{th}$ transform coefficient is a first transform coefficient, a first transform coefficient in the F transform coefficients may be determined as a first coefficient predicted value, a first coefficient residual of the $i^{th}$ transform coefficient may be determined based on the first coefficient predicted value, and encoding processing may be performed on the first coefficient residual to obtain the encoded codeword of the $i^{th}$ transform coefficient. In a case that i is F, encoded codewords corresponding to the F transform coefficients may be used to form the point cloud group bitstream corresponding to the to-be-encoded point cloud group.

In the foregoing embodiment, where the transform coefficient is the second transform coefficient, and encoding processing is performed on the transform coefficient, and where the transform coefficient is the first transform coefficient, a first transform coefficient in the transform coefficients is determined as a first coefficient predicted value, a first coefficient residual of the transform coefficient is determined based on the first coefficient predicted value, and encoding processing is performed on the first coefficient residual, encoding efficiency of the point cloud group bitstream can be improved. In Encoding method (2), in a case that an $i^{th}$ transform coefficient in the F transform coefficients is a second transform coefficient, encoding processing may be performed on the $i^{th}$ transform coefficient to obtain an encoded codeword of the $i^{th}$ transform coefficient, i being a positive integer less than or equal to F. In a case that the $i^{th}$ transform coefficient is a first transform coefficient, a second coefficient predicted value of the $i^{th}$ transform coefficient may be obtained, a second coefficient residual of the $i^{th}$ transform coefficient may be determined based on the second coefficient predicted value, and encoding processing may be performed on the second coefficient residual to obtain the encoded codeword of the $i^{th}$ transform coefficient. The second coefficient predicted value of the $i^{th}$ transform coefficient may be a first transform coefficient that has a closest sequence distance to the $i^{th}$ transform coefficient in first transform coefficients located before the $i^{th}$ transform coefficient. For example, it is assumed that the to-be-encoded transform coefficient sequence is (a first transform coefficient 1, a second transform coefficient 1, a first transform coefficient 2, a second transform coefficient 2, a first transform coefficient 3, . . . ). In this case, for the first transform coefficient 3, a second coefficient predicted value of the first transform coefficient 3 may be the first transform coefficient 2. In a case that i is F, encoded codewords corresponding to the F transform coefficients may be used to form the point cloud group bitstream corresponding to the to-be-encoded point cloud group.

In the foregoing embodiment, where a transform coefficient is the second transform coefficient, and the transform coefficient is performed encoding processing to obtain the encoded codeword of the transform coefficient, and where a transform coefficient is a first transform coefficient, a second coefficient predicted value of the transform coefficient is obtained, a second coefficient residual of the transform coefficient is determined based on the second coefficient predicted value, and encoding processing is performed on the second coefficient residual to obtain the encoded codeword of the transform coefficient, encoding efficiency of the point cloud group bitstream can be improved.

In some embodiments of the disclosure, the transform coefficient sequence may be encoded to obtain the point cloud group bitstream using entropy encoding.

In Encoding method (3), the computer device may perform entropy encoding on the F transform coefficients in the to-be-encoded transform coefficient sequence, to obtain initial codewords corresponding to the F transform coefficients. Secondary encoding may be performed on the $F_1$ first transform coefficients in the F transform coefficients, to obtain re-encoded codewords corresponding to the $F_1$ first transform coefficients. The secondary encoding may include but is not limited to discrete cosine transform (DCT), discrete sine transform (DST), and haar transform. The re-encoded codewords corresponding to the $F_1$ first transform coefficients and initial codewords corresponding to the $F_2$ second transform coefficients may be used to form the point cloud group bitstream corresponding to the to-be-encoded point cloud group.

In the foregoing embodiment, where the initial codewords corresponding to the transform coefficients are first obtained, and then secondary encoding is performed on the first transform coefficients in the transform coefficients to obtain the re-encoded codewords corresponding to the first transform coefficients, the re-encoded codewords and the initial codewords corresponding to the second transform coefficients are directly used to form the point cloud group bitstream corresponding to the to-be-encoded point cloud group, encoding efficiency of the point cloud group bitstream can be improved.

In some embodiments of the disclosure, the transform coefficient sequence may be encoded to obtain the point cloud group bitstream using context-based adaptive binary arithmetic coding (CABAC).

In Encoding method (4), the computer device may directly encode the to-be-encoded transform coefficient sequence by using context-based adaptive binary arithmetic coding (CABAC), to obtain the point cloud group bitstream corresponding to the to-be-encoded point cloud group. The encoding time of the point cloud group bitstream may be saved, thereby further improving efficiency of encoding the point cloud group bitstream.

In some embodiments of the disclosure, the transform coefficient sequence may be encoded to obtain the point cloud group bitstream based on run lengths in the transform coefficient sequence.

In Encoding method (5), the computer device may count a $j^{th}$ run length in the to-be-encoded transform coefficient sequence, and encode the $j^{th}$ run length to obtain a $j^{th}$ run length codeword, j being a positive integer. A $j^{th}$ coefficient value may be encoded to obtain a $j^{th}$ coefficient codeword, the $j^{th}$ coefficient value being, in the to-be-encoded transform coefficient, a character that is located after a character indicated by the $j^{th}$ run length and that is adjacent to the character indicated by the $j^{th}$ run length. In a case that encoding of the to-be-encoded transform coefficient sequence is completed, the obtained run length codeword and coefficient codeword may be used to form the point cloud group bitstream corresponding to the to-be-encoded point cloud group. For example, it is assumed that the to-be-encoded transform coefficient sequence is "0001205", the computer device may obtain, through counting, a first run length as 3, and encode 3 to obtain a first run length codeword; obtain a first coefficient value as 1, and encode 1 to obtain a first coefficient codeword; obtain, through counting, a second run length as 0, and encode 0 to obtain a second run length codeword; obtain a second coefficient value as 2, and encode 2 to obtain a second coefficient codeword; obtain, through counting, a third run length as 1, and encode 1 to obtain a third run codeword; and obtain a third coefficient value as 5, and encode 5 to obtain a third coefficient codeword. In this case, when encoding is completed, the point cloud group bitstream may be obtained by encoding (3, 1, 0, 2, 1, 5) in sequence.

In the foregoing embodiment, the run length in the to-be-encoded transform coefficient sequence is counted, the run length is encoded to obtain the run length codeword, and a corresponding coefficient value is encoded to obtain the coefficient codeword. In a case that encoding of the to-be-encoded transform coefficient sequence is completed, the obtained run length codeword and coefficient codeword are directly used to form the point cloud group bitstream corresponding to the to-be-encoded point cloud group, which can improve encoding efficiency of the point cloud group bitstream.

In some embodiments of the disclosure, the transform coefficient sequence may be encoded to obtain the point cloud group bitstream further based on one of: a cache limit threshold and the group quantity limit threshold; and context models.

In some embodiments, the encoding limit information may further include a cache limit threshold maxBuff. In a case that the $j^{th}$ run length is encoded to obtain a $j^{th}$ run length codeword, a fixed run length encoding may be performed on the $j^{th}$ run length. Specifically, in a case that the $j^{th}$ run length is a first run length obtained in the first transform coefficient, a quantity of first encoding bits used for encoding the first run length may be determined based on the group quantity limit threshold, and the quantity of first encoding bits may be used to encode the $j^{th}$ run length to obtain the $j^{th}$ run length codeword corresponding to the $j^{th}$ run length. The quantity of first encoding bits may be a logarithm of the group quantity limit threshold, which may be denoted as $\log_2$maxGroup, and maxGroup may be used for representing the group quantity limit threshold. In a case that the $j^{th}$ run length is a second run length obtained in the second transform coefficient, a quantity of second encoding bits used for encoding the second run length may be determined based on a difference between the cache limit threshold and the group quantity limit threshold, and the quantity of second encoding bits may be used to encode the $j^{th}$ run length to obtain the $j^{th}$ run length codeword corresponding to the $j^{th}$ run length. The quantity of second encoding bits may be a logarithm of the difference between the cache limit threshold and the group quantity limit threshold, for example, may be denoted as $\log_2$(maxBuff-maxGroup).

In the foregoing embodiment, a run length is a first run length obtained in the first transform coefficient, the run length is encoded by using the quantity of first encoding bits determined based on the group quantity limit threshold, to obtain the run length codeword corresponding to the run length. In a case that a run length is a second run length obtained in the second transform coefficient, the run length is encoded by using the quantity of second encoding bits determined based on a difference between the cache limit threshold and the group quantity limit threshold, to obtain the run length codeword corresponding to the run length, which can improve encoding efficiency of the run length.

In some embodiments, the $j^{th}$ run length may be L, L being a natural number. In a case that the $j^{th}$ run length is encoded to obtain the $j^{th}$ run length codeword, the computer device may obtain N context models; and in a case that the $j^{th}$ run length is any one of model values corresponding to the N context models, a model value corresponding to the $j^{th}$ run length in the N context models may be encoded to obtain the $j^{th}$ run length codeword corresponding to the $j^{th}$ run length, and the N context models may be updated, N being a natural number. In a case that the $j^{th}$ run length is not the model values corresponding to the N context models, entropy encoding may be performed on (L−N) to obtain the $j^{th}$ run length codeword. In some embodiments, the context model may be denoted as ctx[N]. The entropy encoding method for (L−N) may be but is not limited to an Exponential-Golomb encoding method or an arithmetic encoding method. In some embodiments, the process may further be shown in FIG. 6.

In the foregoing embodiment, where the run length is any one of the model values corresponding to the context models, and the model values corresponding to the run length in the context models are encoded, or where the run length is not the model values corresponding to the context models, and (L−N) is directly performed entropy encoding, encoding efficiency of the run length can be improved.

For example, 1) In a case that N=0, a $j^{th}$ run length (that is, L) is directly encoded to obtain a $j^{th}$ run length codeword of the $j^{th}$ run length.

2) In a case that N=1, there is a context model ctx[1], which is used for representing a probability model of 0, that is, a model value corresponding to the context model ctx[1] is 0. Detect whether L is 0, and in addition, ctx[1] is updated. In a case that L is 0, 0 is encoded to obtain the $j^{th}$ run length codeword corresponding to the $j^{th}$ run length. In a case that L is not 0, (L−1) is encoded to obtain the $j^{th}$ run length codeword corresponding to the $j^{th}$ run length.

3) In a case that N=2, there are a context model ctx[1] and a context model ctx[2]. ctx[1] is used for representing a probability model of 0, and a corresponding model value is 0; ctx[2] is used for representing a probability model of 1, and a corresponding model value is 1. Detect whether L is 0 and 1 in sequence, and in addition, ctx[1] and ctx[2] are updated. In a case that L is 0, 0 is encoded to obtain the $j^{th}$ run length codeword corresponding to the $j^{th}$ run length; in a case that L is 1, 1 is encoded to obtain the $j^{th}$ run length codeword corresponding to the $j^{th}$ run length; and in a case that L is neither 0 nor 1, (L−2) is encoded to obtain the $j^{th}$ run length codeword corresponding to the $j^{th}$ run length.

4) In a case that N=4, there are a context model ctx[1], a context model ctx[2], and a context model ctx[3]. ctx[1] is used for representing a probability model of 0, and a corresponding model value is 0; ctx[2] is used for representing a probability model of 1, and a corresponding model value is 1; and ctx[3] is used for representing a probability model of 2, and a corresponding model value is 2. Detect whether L is 0, 1, and 2 in sequence, and in addition, ctx[1], ctx[2], and ctx[3] are updated. In a case that L is 0, 0 is encoded to obtain the $j^{th}$ run length codeword corresponding to the $j^{th}$ run length; in a case that L is 1, 1 is encoded to obtain the $j^{th}$ run length codeword corresponding to the $j^{th}$ run length; in a case that L is 2, 2 is encoded to obtain the $j^{th}$ run length codeword corresponding to the $j^{th}$ run length; and in a case that L is none of 0, 1, and 2, (L−3) is encoded to obtain the $j^{th}$ run length codeword corresponding to the $j^{th}$ run length.

In some embodiments, in a case that a $j^{th}$ coefficient value is encoded to obtain a $j^{th}$ coefficient codeword, the $j^{th}$ coefficient value may be directly encoded by using context-based adaptive binary arithmetic coding, to obtain the $j^{th}$ coefficient codeword, and encoding time for the coefficient value may be reduced, thereby improving encoding efficiency of the coefficient value.

In some embodiments, a $j^{th}$ coefficient value may be C, C being a natural number. In a case that the $j^{th}$ coefficient value is encoded to obtain a $j^{th}$ coefficient codeword, the computer device may obtain P context models; and in a case that the $j^{th}$ coefficient value is any one of model values corresponding to the P context models, a model value corresponding to the $j^{th}$ coefficient value in the P context models may be encoded to obtain a $j^{th}$ coefficient codeword corresponding to the $j^{th}$ coefficient value, and the P context models may be updated, P being a natural number. In a case that the $j^{th}$ coefficient value is not model values corresponding to the P context models, entropy encoding may be performed on (C−P) to obtain a $j^{th}$ coefficient codeword. In some embodiments, the context model may be denoted as ctx[P]. The entropy encoding method for (C−P) may be but is not limited to an Exponential-Golomb encoding method or an arithmetic encoding method.

In the foregoing embodiment, where the coefficient value is any one of the model values corresponding to the context models, and the model values corresponding to the coefficient value in the context models are encoded, or where the coefficient value is not the model values corresponding to the context models, and (C−P) is performed entropy encoding, encoding efficiency of the coefficient value can be improved.

For example, 1) In a case that P=0, a $j^{th}$ coefficient value (that is, C) is directly encoded to obtain a $j^{th}$ coefficient codeword of the $j^{th}$ coefficient value.

2) In a case that P=1, there is a context model ctx[1], which is used for representing a probability model of 0, that is, a model value corresponding to the context model ctx[1] is 0. Detect whether C is 0, and in addition, ctx[1] is updated. In a case that C is 0, 0 is encoded to obtain the j coefficient codeword corresponding to the $j^{th}$ coefficient value. In a case that C is not 0, (C−1) is encoded to obtain the $j^{th}$ coefficient codeword corresponding to the $j^{th}$ coefficient value.

3) In a case that P=2, there are a context model ctx[1] and a context model ctx[2]. ctx[1] is used for representing a probability model of 0, and a corresponding model value is 0; ctx[2] is used for representing a probability model of 1, and a corresponding model value is 1. Detect whether C is 0 and 1 in sequence, and in addition, ctx[1] and ctx[2] are updated. In a case that C is 0, 0 is encoded to obtain the $j^{th}$ coefficient codeword corresponding to the $j^{th}$ coefficient value; In a case that C is 1, 1 is encoded to obtain the $j^{th}$ coefficient codeword corresponding to the $j^{th}$ coefficient value; in a case that C is neither 0 nor 1, (C−2) is encoded to obtain the $j^{th}$ coefficient codeword corresponding to the $j^{th}$ coefficient value.

4) In a case that P=3, there are a context model ctx[1], a context model ctx[2], and a context model ctx[3]. ctx[1] is used for representing a probability model of 0, and a corresponding model value is 0; ctx[2] is used for representing a probability model of 1, and a corresponding model value is 1; and ctx[3] is used for representing a probability model of 2, and a corresponding model value is 2. Detect whether C is 0, 1, and 2 in sequence, and in addition, ctx[1], ctx[2], and ctx[3] are updated. In a case that C is 0, 0 is encoded to obtain the $j^{th}$ coefficient codeword corresponding to the $j^{th}$ coefficient value; in a case that C is 1, 1 is encoded to obtain the $j^{th}$ coefficient codeword corresponding to the $j^{th}$ coefficient value; in a case that C is 2, 2 is encoded to obtain the $j^{th}$ coefficient codeword corresponding to the $j^{th}$ coefficient value; and in a case that C is none of 0, 1, and 2, (C−3) is encoded to obtain the $j^{th}$ coefficient codeword corresponding to the $j^{th}$ coefficient value.

In the embodiments of the disclosure, a to-be-encoded transform coefficient sequence of to-be-encoded point cloud points included in a to-be-encoded point cloud group may be obtained based on encoding limit information, where the encoding limit information may include a group quantity limit threshold, where a quantity of to-be-encoded point cloud groups may be less than or equal to the group quantity limit threshold, and where the to-be-encoded transform coefficient sequence may be obtained by sorting transform coefficients of the to-be-encoded point cloud points included in the to-be-encoded point cloud group. The to-be-encoded transform coefficient sequence may be encoded to obtain a point cloud group bitstream corresponding to the to-be-encoded point cloud group. In addition, a decoding process may be performed based on the encoding limit information, so that when an abnormality occurs in an encoding and decoding process, an impact on the overall encoding and decoding process may be less, and fault tolerance of encoding and decoding may be improved. In addition, limit on encoding and decoding may be performed based on encoding limit information, spatial random access of point clouds may be implemented, and rapid decoding and reconstruction of part of point clouds may be further enabled, thereby improving encoding and decoding performance and encoding and decoding efficiency.

Figure 4:
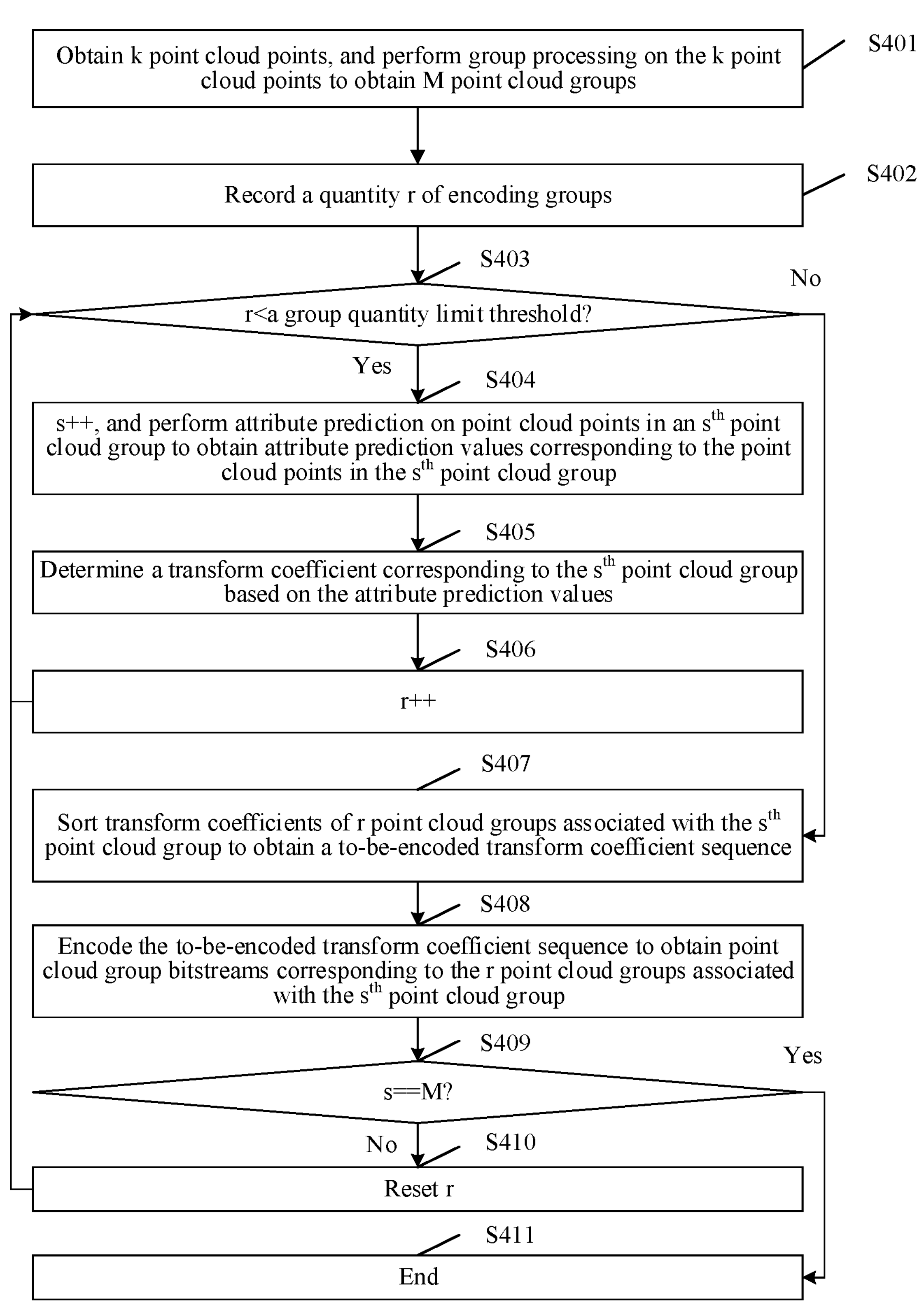
FIG. 4 is a flowchart of point cloud group encoding according to some embodiments of the disclosure.

FIG. 4 is a flowchart of point cloud group encoding according to some embodiments of the disclosure. As shown in FIG. 4, the method may include the following operations:

Operation S401. Obtain k point cloud points, and perform group processing on the k point cloud points to obtain M point cloud groups.

In the embodiments of the disclosure, the computer device may obtain k point cloud points, and perform group processing on the k point cloud points to obtain M point cloud groups, K being a positive integer, and M being a positive integer less than or equal to k. Specifically, the computer device may obtain a point cloud group size threshold, and divide the k point cloud points into M point cloud groups based on the point cloud group size threshold. A quantity of point cloud points included in each of the M point cloud groups is less than the point cloud group size threshold. Alternatively, the computer device may obtain a default quantity of groups, and divide the k point cloud points into M point cloud groups. In this case, M is the default quantity of groups.

Alternatively, the computer device may obtain k point cloud points and coordinate codewords corresponding to point cloud points, and divide point cloud points with a same codeword sequence obtained through the grouping movement bits into M point cloud groups. In some embodiments, a quantity of grouping movement bits may be a fixed value, or may be a variable value.

Specifically, the quantity of grouping movement bits corresponding to the M point cloud groups may be a quantity of default grouping movement bits, that is, the quantity of grouping movement bits may be a fixed value. The quantity of default grouping movement bits may be obtained based on experience, or provided by a user, or may be a quantity of historical grouping movement bits. Mobile grouping may be performed through the fixed value, so that the coordinate codewords of the point cloud points may be grouped on the same basis. In this case, efficiency of grouping point cloud points and subsequent obtaining of candidate point sets may be improved.

Alternatively, a quantity of group movement bits may be a variable value. Specifically, in a case that an average quantity of point cloud points included in $M_1$ adjacent point cloud groups adjacent to a target point cloud group is greater than a quantity of first point thresholds, a quantity of grouping movement bits corresponding to the target point cloud group may be less than a quantity of grouping movement bits corresponding to the $M_1$ adjacent point cloud groups; in a case that an average quantity of point cloud points included in $M_1$ adjacent point cloud groups adjacent to a target point cloud group is less than a quantity of second point thresholds, a quantity of grouping movement bits corresponding to the target point cloud group may be greater than a quantity of grouping movement bits corresponding to the $M_1$ adjacent point cloud groups, $M_1$ being a positive integer less than M; and in a case that an average quantity of point cloud points included in $M_1$ adjacent point cloud groups adjacent to a target point cloud group is greater than or equal to a quantity of second point thresholds, and less than or equal to a quantity of first point thresholds, a quantity of grouping movement bits of the target point cloud group may be the same as a quantity of grouping movement bits of a previous point cloud group of the target point cloud group. That is, in a case that a quantity of point cloud points included in an adjacent point cloud group is excessively large, a quantity of point cloud points included in a subsequently generated point cloud group may be reduced by reducing a quantity of grouping movement bits; and in a case that a quantity of point cloud points included in an adjacent point cloud group is excessively small, a quantity of point cloud points included in a subsequently generated point cloud group may be increased by increasing a quantity of grouping movement bits, so that a quantity of point cloud points included in each point cloud group may be balanced as much as possible, to improve an effect of grouping point cloud groups.

Operation S402. Record a quantity r of encoding groups.

In the embodiments of the disclosure, the quantity of encoding groups r may be recorded. An initial value of r may be 0, and the quantity of encoding groups r may be used for limiting a quantity of to-be-encoded point cloud groups that need to be encoded in one encoding.

Operation S403. r<a group quantity limit threshold?

In the embodiments of the disclosure, detect whether r is less than the group quantity limit threshold. In a case that r is less than the group quantity limit threshold, it represents that point cloud groups may continue to be added for encoding, and operation S404 may be performed; or in a case that r is greater than or equal to the group quantity limit threshold, it represents that a quantity of to-be-encoded point cloud groups that need to be encoded may have reached the group quantity limit threshold, and operation S407 may be performed to start encoding. In this way, a quantity of point cloud groups that need to be processed for one encoding may be limited, to improve encoding performance and efficiency. In addition, in a case that an abnormality occurs in an encoding process, an encoding process of another point cloud group may not be affected, thereby improving fault tolerance of encoding.

Operation S404. s++, and perform attribute prediction on the point cloud points in an $s^{th}$ point cloud group to obtain attribute predicted values corresponding to the point cloud points in the $s^{th}$ point cloud group.

In the embodiments of the disclosure, s++, where an initial value of s may be 0, s++ may be used for representing adding one to the value of s, that is, s=s+1. For example, in this case, s may be 3. After s++, s may be 4, that is, a currently processed point cloud group is changed from a third point cloud group to a fourth point cloud group. Further, attribute prediction is performed on the point cloud points in an $s^{th}$ point cloud group to obtain attribute predicted values corresponding to the point cloud points in the $s^{th}$ point cloud group. In some embodiments, in the M point cloud groups, predicted reference points of point cloud points in the $s^{th}$ point cloud group may be obtained, and the point cloud points may be predicted based on the predicted reference points to obtain attribute predicted values corresponding to the point cloud points in the $s^{th}$ point cloud group. Using a point cloud point as an example (denoted as a target point cloud point), a neighboring node of the target point cloud point may be obtained from a point cloud point located before the target point cloud point, and the neighboring node of the target point cloud point may be determined as a predicted reference point of the target point cloud point. Alternatively, a candidate point set of the target point cloud group in which the target point cloud point is located may be obtained from the M point cloud groups, and a predicted reference point corresponding to the target point cloud group may be obtained from the candidate point set. The predicted reference point corresponding to the target point cloud group may be used as the predicted reference points of the point cloud points included in the target point cloud group. The above are only examples of several manners for obtaining the predicted reference point. The disclosure is not limited to the foregoing manners, and another manner may also be used to obtain the predicted reference point.

Alternatively, the computer device may determine an attribute initial value of the first point cloud point in the $s^{th}$ point cloud group as attribute predicted values corresponding to the point cloud points in the $s^{th}$ point cloud group. That is, the attribute predicted values of different point cloud points in the $s^{th}$ point cloud group may be the same or different.

Operation S405. Determine a transform coefficient corresponding to the $s^{th}$ point cloud group based on the attribute predicted values.

In the embodiments of the disclosure, the computer device may obtain attribute residuals of the point cloud points in the $s^{th}$ point cloud group based on the attribute predicted values, and obtain a transform coefficient corresponding to the $s^{th}$ point cloud group based on the attribute predicted values and attribute residuals of the point cloud points in the $s^{th}$ point cloud group. The transform coefficient corresponding to the $s^{th}$ point cloud group may be obtained from the transform coefficients of the point cloud points in the $s^{th}$ point cloud group.

Operation S406. r++.

In the embodiments of the disclosure, perform r++, that is, a new to-be-encoded point cloud group may be obtained, return to operation S403, and detect whether r is less than the group quantity limit threshold. In a case that r is less than the group quantity limit threshold, the next point cloud group may be processed, or in a case that r is the group quantity limit threshold, a to-be-encoded point cloud group that currently needs to be processed may be determined. Further, in some embodiments, it may be detected whether s is M. In a case that s is M, it represents that processing of the M point cloud groups may be completed, and operation S407 may be performed; or in a case that s is not M, it represent that there may still be a point cloud group that has not been processed, the $s^{th}$ point cloud group may be determined as a to-be-encoded point cloud group, and operation S403 may be performed.

Operation S407. Sort transform coefficients of r point cloud groups associated with the $s^{th}$ point cloud group to obtain a to-be-encoded transform coefficient sequence.

In the embodiments of the disclosure, the r point cloud groups associated with the $s^{th}$ point cloud group may be determined as to-be-encoded point cloud groups that need to be processed currently. In some embodiments, in a case that the operation is called by operation S403, r may be the group quantity limit threshold; or in a case that the operation is called by operation S406, r may be a positive integer less than or equal to the group quantity limit threshold. Specifically, the transform coefficients of the r point cloud groups associated with the $s^{th}$ point cloud group may be sorted to obtain the to-be-encoded transform coefficient sequence. Specifically, reference may be made to a specific description of operation S301 in FIG. 3.

Operation S408. Encode the to-be-encoded transform coefficient sequence to obtain point cloud group bitstreams corresponding to the r point cloud groups associated with the $s^{th}$ point cloud group.

In the embodiments of the disclosure, reference may be made to a specific description of operation S302 in FIG. 3.

Operation S409. s==M?

In the embodiments of the disclosure, it is detected whether s is equal to M. In a case that s is equal to M, operation S411 may be performed to end this encoding process; or in a case that s is not equal to M, operation S410 may be performed.

Operation S410. Reset r.

In the embodiments of the disclosure, a value of r may be reset to an initial value and return to operation S403 to obtain a next to-be-encoded point cloud group.

Operation S411. End.

Figures 5, 6, 7, 8:
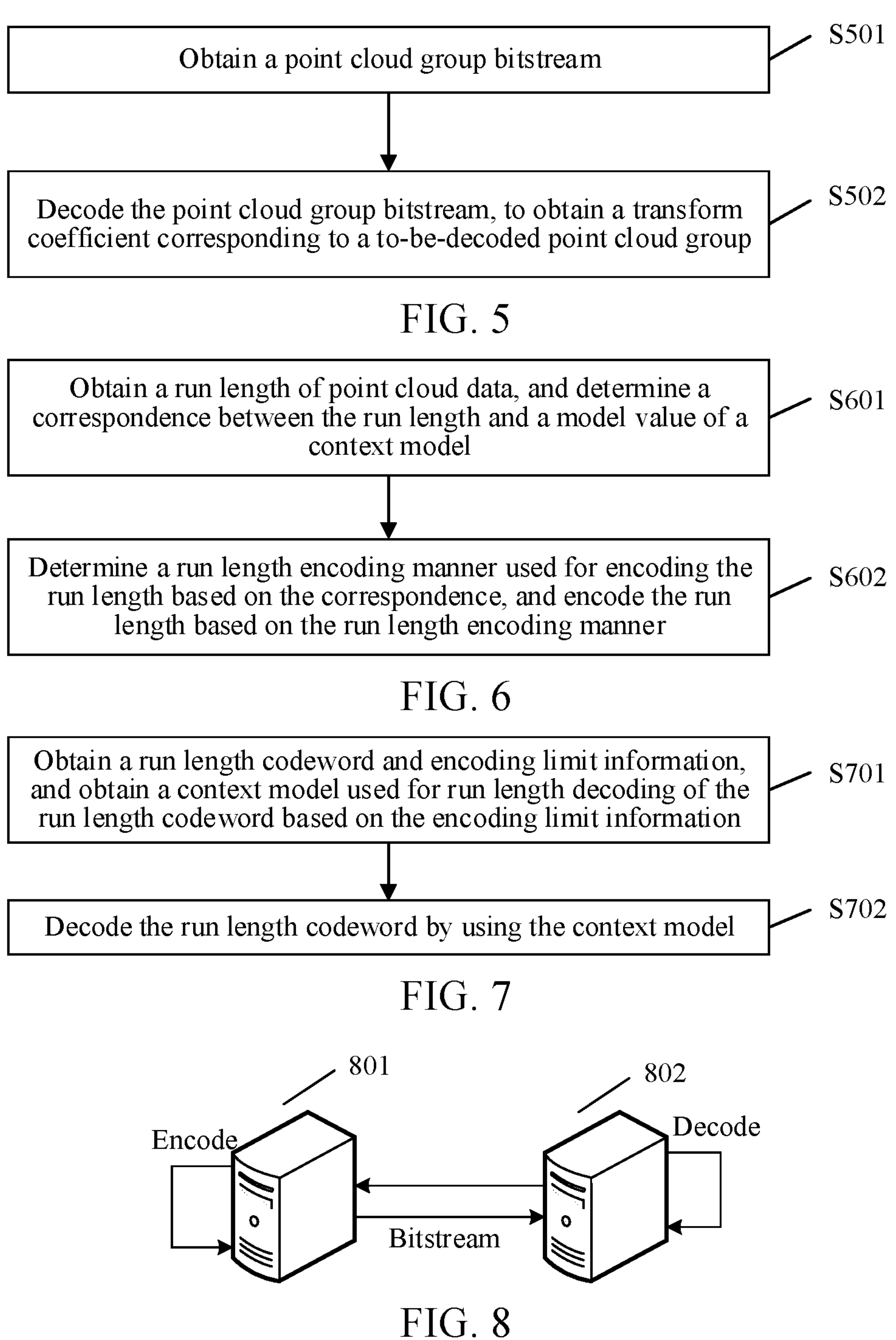
FIG. 5 is a flowchart of a point cloud decoding method according to some embodiments of the disclosure.
FIG. 6 is a flowchart of a run length encoding method according to some embodiments of the disclosure.
FIG. 7 is a flowchart of a run length decoding method according to some embodiments of the disclosure.
FIG. 8 is an architecture diagram showing data interactions according to some embodiments of the disclosure.

Further, FIG. 5 is a flowchart of a point cloud decoding method according to some embodiments of the disclosure. As shown in FIG. 5, the point cloud decoding process may include the following operations:

Operation S501. Obtain a point cloud group bitstream.

In the embodiments of the disclosure, the point cloud group bitstream may be used for representing an encoded bitstream of a to-be-decoded point cloud group, and a quantity of to-be-decoded point cloud groups may be less than or equal to a group quantity limit threshold in encoding limit information.

Operation S502. Decode the point cloud group bitstream, to obtain a transform coefficient corresponding to a to-be-decoded point cloud group.

In the embodiments of the disclosure, the point cloud group bitstream may be decoded based on the encoding method, to obtain a transform coefficient corresponding to a to-be-decoded point cloud group.

Specifically, in Encoding method (1), the computer device may decode a point cloud group bitstream to obtain decoded data. In this case, the decoded data may include the decoded second transform coefficient and a decoded residual. A first coefficient predicted value may be obtained. Based on the first coefficient predicted value and the decoded residual in the decoded data, the decoded first transform coefficient may be obtained. In this case, the decoded first transform coefficient and the decoded second transform coefficient may form a decoded transform coefficient sequence. The decoded transform coefficient sequence may be used for representing the transform coefficient corresponding to the to-be-encoded point cloud group.

In Encoding method (2), the computer device may decode a point cloud group bitstream to obtain decoded data. In this case, the decoded data may include the decoded second transform coefficient and a decoded residual. A second coefficient predicted value may be obtained. Based on the second coefficient predicted value and the decoded residual in the decoded data, the decoded first transform coefficient may be obtained. In this case, the decoded first transform coefficient and the decoded second transform coefficient may form a decoded transform coefficient sequence. The decoded transform coefficient sequence may be used for representing the transform coefficient corresponding to the to-be-encoded point cloud group.

In Encoding method (3), the computer device may decode a point cloud group bitstream to obtain an initial decoded codeword, perform secondary decoding on the initial decoded codeword corresponding to the first transform coefficient in the initial decoded codeword to obtain the decoded first transform coefficient, and use an initial decoded codeword corresponding to the second transform coefficient and the decoded first transform coefficient to form a decoded transform coefficient sequence.

In Encoding method (4), the computer device may directly decode a point cloud group bitstream by using context-based adaptive binary arithmetic coding (CABAC), to obtain a decoded transform coefficient sequence.

In some embodiments, in a fixed run length encoding under a decoding method (5), the computer device may obtain a group quantity limit threshold, determine a quantity of first encoding bits based on the group quantity limit threshold, and determine a quantity of second encoding bits based on a difference between a cache limit threshold and a group quantity limit threshold. The point cloud group bitstream may be decoded by using the quantity of first encoding bits and the quantity of second encoding bits, to obtain a decoded transform coefficient sequence.

In some embodiments, encoding may be performed based on the context model under Encoding method (5), and a decoding process may refer to descriptions shown in FIG. 7.

Further, inverse transformation may be performed on the transform coefficient corresponding to the to-be-decoded point cloud group, to obtain attribute residuals of to-be-decoded point cloud points included in the to-be-decoded point cloud group; and the to-be-decoded point cloud points may be reconstructed based on the attribute residuals of the to-be-decoded point cloud points, to obtain attribute reconstruction values of the to-be-decoded point cloud points. Specifically, the computer device may perform inverse sorting on a decoded transform sequence to obtain an original coefficient sequence corresponding to the to-be-decoded point cloud group, and perform inverse transformation on the original coefficient sequence to obtain attribute residuals of to-be-decoded point cloud points included in the to-be-decoded point cloud group. The attribute predicted values of the to-be-decoded point cloud points included in the to-be-decoded point cloud group may be obtained, and attribute reconstruction values of the to-be-decoded point cloud points may be obtained based on the attribute predicted values and the attribute residuals.

In the foregoing embodiment, inverse transformation may be performed on the transform coefficient corresponding to the to-be-decoded point cloud group, the to-be-decoded point cloud points may be reconstructed by using the attribute residuals obtained by the inverse transformation, and the attribute reconstruction values of the to-be-decoded point cloud points may be quickly obtained, thereby improving efficiency of obtaining the attribute reconstruction values.

In the embodiments of the disclosure, a point cloud group bitstream may be obtained, where the point cloud group bitstream may be used for representing an encoded bitstream of a to-be-decoded point cloud group, a quantity of to-be-decoded point cloud groups may be less than or equal to a group quantity limit threshold in encoding limit information; and the point cloud group bitstream may be decoded to obtain a transform coefficient corresponding to a to-be-decoded point cloud group. In this way, a decoding process may be performed based on the encoding limit information, so that when an abnormality occurs in the decoding process, an impact on the overall decoding process may be less, and fault tolerance of decoding may be improved. In addition, limit on decoding may be performed based on encoding limit information, spatial random access of point clouds may be implemented, and rapid decoding and reconstruction of part of point clouds may be further enabled, thereby improving decoding performance and decoding efficiency.

In some embodiments, reference may be made FIG. 6. FIG. 6 is a flowchart of a run length encoding method according to some embodiments of the disclosure. As shown in FIG. 6, a method used for describing a decoding process of a run length may include the following operations:

Operation S601. Obtain a run length of point cloud data, and determine a correspondence between the run length and a model value of a context model, the context model being determined based on pre-obtained encoding limit information.

In the embodiments of the disclosure, N context models used for encoding a run length may be obtained, N being a natural number. In a case that a run length is any one of model values corresponding to N context models, a correspondence between the run length and the model values of the N context models may be determined as a first correspondence; or in a case that a run length is not any one of model values corresponding to N context models, a correspondence between the run length and the model values of the N context models may be determined as a second correspondence.

In the foregoing embodiment, where it is determined whether a run length is any one of model values corresponding to N context models, and a correspondence between the run length and the model values of the N context models is directly determined, efficiency of obtaining the correspondence may be improved.

Operation S602. Determine a run length encoding manner used for encoding the run length based on the correspondence, and encode the run length based on the run length encoding manner.

In the embodiments of the disclosure, a run length may be L, L being a natural number. In a case that a correspondence is the first correspondence, it may be determined that a run length encoding manner used for encoding the run length is a context model encoding manner, where model values corresponding to the run length in the N context models may be encoded based on the context model encoding manner, and the N context models may be updated; or in a case that a correspondence is the second correspondence, it may be determined that a run length encoding manner used for encoding the run length is a difference encoding manner, and entropy encoding may be performed on (L−N) based on the difference encoding manner.

In other words, in a case that the run length is any one of model values corresponding to the N context models, the run length may be encoded by using the model values corresponding to the run length in the N context models. In a case that the run length is not any one of the model values corresponding to the N context models, the run length may be encoded by using (L−N). Specifically, reference may be made to a specific description of Encoding method (5) in operation S302 shown in FIG. 3.

In the foregoing embodiment, where a run length encoding manner used for encoding the run length is determined depending on whether the correspondence is the first correspondence or the second correspondence, and then model values corresponding to the run length in the N context models are encoded based on the context model encoding manner, efficiency of encoding the run length may be improved.

In some embodiments, encoding limit information may be obtained, a quantity of encoding bits used for encoding the run length may be determined based on the encoding limit information, and a context model used for encoding the run length may be determined based on the encoding limit information. A run length encoding manner used for encoding the run length may be determined based on the correspondence. The run length may be encoded based on the run length encoding manner and a quantity of encoding bits corresponding to the run length. Specifically, in a case that a correspondence is the first correspondence, it may be determined that a run length encoding manner used for encoding the run length is a context model encoding manner, where model values corresponding to the run length in the N context models may be encoded based on the context model encoding manner and the quantity of encoding bits corresponding to the run length, and the N context models may be updated; or in a case that a correspondence is the second correspondence, it may be determined that a run length encoding manner used for encoding the run length is a difference encoding manner, and entropy encoding may be performed on (L−N) based on the difference encoding manner and the quantity of encoding bits corresponding to the run length. Encoding the run length based on the quantity of encoding bits corresponding to the run length may indicate that a length of data obtained by encoding in this case is the quantity of encoding bits corresponding to the run length. For example, the data obtained by encoding the run length may be denoted as a run length codeword, which may indicate that a length of the run length codeword is the quantity of encoding bits corresponding to the run length.

In the foregoing embodiment, where a run length encoding manner used for encoding the run length is determined depending on whether the correspondence is the first correspondence or the second correspondence, and then model values corresponding to the run length in the N context models are encoded based on the context model encoding manner, efficiency of encoding the run length may be improved.

In some embodiments, in a case that a context model used for encoding a run length is determined based on encoding limit information, N context models used for encoding the run length may be determined based on the encoding limit information. In a case that N is not 0, the N context models may further include a context model indicating the model value of "the quantity of encoding bits corresponding to the run length". For example, it is assumed that a quantity of encoding bits corresponding to the run length is 20 and N is 3. In this case, context models ctx[0], ctx[1], and ctx[20] may be determined. A model value of the context model ctx[0] is 0, a model value of the context model ctx[1] is 1, and a model value of the context model ctx[20] is 20; or it is assumed that a quantity of encoding bits corresponding to the run length is 20 and N is 3. In this case, context models ctx[0], ctx[1], and ctx[2] may be determined. A model value of the context model ctx[0] is 0, a model value of the context model ctx[1] is 1, and a model value of the context model ctx[2] is 2.

In a case that a quantity of encoding bits used for encoding the run length is determined, the encoding limit information may include the group quantity limit threshold and/or the cache limit threshold, and a logarithm of the group quantity limit threshold may be determined as the quantity of encoding bits used for encoding the run length. Alternatively, a logarithm of a difference between the cache limit threshold and the group quantity limit threshold may be determined as a quantity of encoding bits used for encoding the run length.

In the foregoing embodiment, where the logarithm of the group quantity limit threshold is directly determined as the quantity of encoding bits, or a logarithm of the difference between the cache limit threshold and the group quantity limit threshold is directly determined as the quantity of encoding bits, efficiency of obtaining the quantity of encoding bits may be improved.

Alternatively, a historical run length obtained under the group quantity limit threshold may be obtained; and a quantity of encoding bits used for encoding the run length may be determined based on a numerical distribution of the historical run length, where time of obtaining the quantity of encoding bits may be reduced, thereby improving efficiency of obtaining the quantity of encoding bits.

In some embodiments, a coefficient value of point cloud data may be obtained, and a correspondence between the coefficient value and a model value of a context model may be determined; where a coefficient encoding manner used for encoding the coefficient value may be determined based on the correspondence, and the coefficient value may be encoded based on the coefficient encoding manner. Specifically, P context models used for encoding the coefficient value may be obtained, P being a natural number. In a case that a coefficient value is any one of model values corresponding to P context models, a correspondence between the coefficient value and the model values of the P context models may be determined as a first correspondence; or in a case that a coefficient value is not any one of model values corresponding to P context models, a correspondence between the coefficient value and the model values of the P context models may be determined as a second correspondence.

In some embodiments, the coefficient value may be C, C being a natural number. In a case that a correspondence between a coefficient value and a model value of a context model is the first correspondence, it may be determined that a coefficient encoding manner used for encoding the coefficient value is a context model encoding manner, where model values corresponding to the coefficient values in the P context models may be encoded based on the context model encoding manner, and the P context models may be updated; or in a case that a correspondence between a coefficient value and a model value of a context model is the second correspondence, it may be determined that a coefficient encoding manner used for encoding the coefficient value is a difference encoding manner, and entropy encoding may be performed on (C−P) based on the difference encoding manner.

In other words, in a case that the coefficient value is any one of model values corresponding to the P context models, the coefficient value may be encoded by using the model values corresponding to the coefficient value in the P context models. In a case that the coefficient value is not any one of the model values corresponding to the P context models, the coefficient value may be encoded by using (C−P).

In the embodiments of the disclosure, the run length of the point cloud data may be obtained, the encoding limit information may be obtained, the context model used for encoding the run length may be obtained based on the encoding limit information, the correspondence between the run length and the model value of the context model may be determined, the run length encoding manner used for encoding the run length may be determined based on the correspondence, and the run length may be encoded based on the run length encoding manner. In this way, an encoding process may be performed based on the encoding limit information, so that when an abnormality occurs in the encoding process, an impact on the overall encoding process may be less, and fault tolerance of encoding may be improved. In addition, limit on encoding may be performed based on encoding limit information, spatial random access of point clouds may be implemented, and rapid decoding and reconstruction of part of point clouds may further be enabled, thereby improving decoding performance and decoding efficiency.

For operations in FIG. 6, reference may be made to a specific description of Encoding method (5) in operation S302 in FIG. 3.

In some embodiments, reference may be made FIG. 7. FIG. 7 is a flowchart of a run decoding method according to some embodiments of the disclosure. As shown in FIG. 7, a method used for describing a decoding process of a run length may include the following operations:

Operation S701. Obtain a run length codeword and encoding limit information, and obtain a context model used for run length decoding of the run length codeword based on the encoding limit information.

In the embodiments of the disclosure, N context models used for run length decoding may be obtained, N being a natural number. In some embodiments, when encoding the run length, encoding limit information may be used for encoding. When decoding in this manner, a quantity of encoding bits used for encoding the run length may be determined based on the encoding limit information, and a context model used for encoding the run length may be determined based on the encoding limit information. For this process, reference may be made to a process for obtaining a quantity of encoding bits corresponding to the run length and the context model shown in FIG. 6. Then, based on the quantity of encoding bits corresponding to the obtained run length and the context model, operation S702 may be performed to decode the run length codeword.

Operation S702. Decode the run length codeword by using the context model, in a case that a value obtained by decoding the context model is different from a model value of the context model for decoding, the run length codeword is decoded.

In the embodiments of the disclosure, the run length codeword may be decoded by using the N context models in sequence. In a case that a decoding result is obtained (which may be denoted as a first decoding result), the decoding result may be determined as a run length corresponding to the run length codeword. It may be understood that, in a case that values encoded by using N context models are the same as the model value of the context model used for decoding, that is, the value decoded by using the context model is available, the decoding result may be obtained. In a case that values encoded by using N context models are different from the model value of the context model used for decoding, the value decoded by using the context model may not be used, but the run length codeword may be directly decoded to obtain an initial decoded data, and the initial decoded data may be restored to obtain the run length corresponding to the run length codeword. It may be understood that direct decoding and decoding by using context model are two decoding manners. The initial decoded data that directly decode the run length codeword may refer to a result obtained by direct decoding without using the context model. In some embodiments, in a case that values decoded by using N context models are different from the model value of the context model used for decoding, a decoding method for the run length codeword may be obtained based on the foregoing encoding method for the run length. For example, in a case that the foregoing encoding method for the run length is an Exponential-Golomb encoding method, the decoding method for the run length codeword herein may be the Exponential-Golomb decoding method; or for example, in a case that the foregoing encoding method for the run length is an arithmetic encoding method, the decoding method for the run length codeword herein may be an arithmetic decoding method.

For example, 1) In a case that N=0, a run length codeword may be directly decoded.

2) In a case that N=1, there is a context model ctx[1], which is used for representing a probability model of 0, that is, a model value corresponding to the context model ctx[1] is 0. The run length codeword is decoded by using ctx[1]. In a case that the obtained value is not 0, the next step of decoding is performed on the run length codeword. In this case, the obtained value is an initial decoded data (L−N), and the initial decoded data (L−N) is restored to determine the run length corresponding to the run length codeword.

3) In a case that N=2, there are a context model ctx[1] and a context model ctx[2]. ctx[1] is used for representing a probability model of 0, and a corresponding model value is 0; ctx[2] is used for representing a probability model of 1, and a corresponding model value is 1. The run length codeword is decoded by using ctx[1]. In a case that a value obtained by using ctx[1] is not 0, ctx[2] is used to decode the run length codeword. In a case that a value obtained by using ctx[2] is not 1, the next step of decoding is performed on the run length codeword. In this case, the obtained value is an initial decoded data (L−N), and the initial decoded data (L−N) is restored to determine the run length corresponding to the run length codeword.

4) In a case that N=4, there are a context model ctx[1], a context model ctx[2], and a context model ctx[3]. ctx[1] is used for representing a probability model of 0, and a corresponding model value is 0; ctx[2] is used for representing a probability model of 1, and a corresponding model value is 1; and ctx[3] is used for representing a probability model of 2, and a corresponding model value is 2. The run length codeword is decoded by using ctx[1]. In a case that a value obtained by using ctx[1] is not 0, ctx[2] is used to decode the run length codeword. In a case that a value obtained by using ctx[2] is not 1, ctx[3] is used to decode the run length codeword. In a case that a value obtained by using ctx[3] is not 2, the next step of decoding is performed on the run length codeword. In this case, the obtained value is an initial decoded data (L−N), and the initial decoded data (L−N) is restored to determine the run length corresponding to the run length codeword.

In the embodiments of the disclosure, by obtaining a run length codeword and encoding limit information, a context model used for run length decoding of the run length codeword based on the encoding limit information may be obtained; and the run length codeword may be decoded by using the context model. In this way, a decoding process may be performed based on the encoding limit information, so that when an abnormality occurs in the decoding process, an impact on the overall decoding process may be less, and fault tolerance of decoding may be improved. In addition, limit on decoding may be performed based on encoding limit information, spatial random access of point clouds may be implemented, and rapid decoding and reconstruction of part of point clouds may be further enabled, thereby improving decoding performance and decoding efficiency.

Further, a coefficient codeword may be obtained, and a context model used for decoding a coefficient value may be obtained. The coefficient codeword may be decoded by using the context model, in a case that a value obtained by decoding the context model is different from a model value of the context model for decoding, the coefficient value may be decoded. Specifically, P context models used for decoding the coefficient value may be obtained, P being a natural number. The coefficient codeword may be decoded by using the P context models in sequence. In a case that a decoding result is obtained (which may be denoted as a second decoding result), the decoding result may be determined as the coefficient value corresponding to the coefficient codeword. In a case that values encoded by using P context models are different from the model value of the context model used for decoding, the coefficient codeword may be decoded to obtain an initial coefficient data, and the initial coefficient data may be restored to obtain the coefficient value corresponding to the coefficient codeword. In some embodiments, in a case that values decoded by using P context models are different from the model value of the context model used for decoding, a decoding method for the coefficient codeword may be obtained based on the foregoing encoding method for the coefficient value. For example, in a case that the foregoing encoding method for the coefficient value is an Exponential-Golomb encoding method, the decoding method for the coefficient codeword herein may be the Exponential-Golomb decoding method; or for example, in a case that the foregoing encoding method for the coefficient value is an arithmetic encoding method, the decoding method for the coefficient codeword herein may be an arithmetic decoding method.

For example, 1) In a case that P=0, a coefficient codeword may be directly decoded.

2) In a case that P=1, there is a context model ctx[1], which is used for representing a probability model of 0, that is, a model value corresponding to the context model ctx[1] is 0. The coefficient codeword is decoded by using ctx[1]. In a case that the obtained value is not 0, the next step of decoding is performed on the coefficient codeword. In this case, the obtained value is an initial coefficient data (C−P), and the initial coefficient data (C−P) is restored to determine the coefficient value corresponding to the coefficient codeword.

3) In a case that P=2, there are a context model ctx[1] and a context model ctx[2]. ctx[1] is used for representing a probability model of 0, and a corresponding model value is 0; ctx[2] is used for representing a probability model of 1, and a corresponding model value is 1. The coefficient codeword is decoded by using ctx[1]. In a case that a value obtained by using ctx[1] is not 0, ctx[2] is used to decode the coefficient codeword. In a case that a value obtained by using ctx[2] is not 1, the next step of decoding is performed on the coefficient codeword. In this case, the obtained value is an initial coefficient data (C−P), and the initial coefficient data (C−P) is restored to determine the coefficient value corresponding to the coefficient codeword.

4) In a case that P=3, there are a context model ctx[1], a context model ctx[2], and a context model ctx[3]. ctx[1] is used for representing a probability model of 0, and a corresponding model value is 0; ctx[2] is used for representing a probability model of 1, and a corresponding model value is 1; and ctx[3] is used for representing a probability model of 2, and a corresponding model value is 2. The coefficient codeword is decoded by using ctx[1]. In a case that a value obtained by using ctx[1] is not 0, ctx[2] is used to decode the coefficient codeword. In a case that a value obtained by using ctx[2] is not 1, ctx[3] is used to decode the coefficient codeword. In a case that a value obtained by using ctx[3] is not 2, the next step of decoding is performed on the coefficient codeword. In this case, the obtained value is an initial coefficient data (C−P), and the initial coefficient data (C−P) is restored to determine the coefficient value corresponding to the coefficient codeword.

The foregoing encoding process and decoding process may be implemented in a same computer device, or may be implemented in different computer devices. For example, when implemented in different computer devices, reference may be made to FIG. 8. FIG. 8 is an architecture diagram showing data interactions according to some embodiments of the disclosure. As shown in FIG. 8, a computer device 801 may encode k point cloud points to obtain an encoded bitstream, where a quantity of bitstreams corresponding to the k point cloud points may be one or at least two. The computer device 801 may transmit the encoded bitstream to a computer device 802, and the computer device 802 may decode the obtained bitstream, so that the k point cloud points may be obtained. Specifically, attribute reconstruction values corresponding to the k point cloud points may be obtained. In some embodiments, the computer device 801 may obtain k point cloud points from the computer device 801, or may obtain k point cloud points from the computer device 802, or may obtain k point cloud points from another associated device. This is not limited herein.

Figure 9:
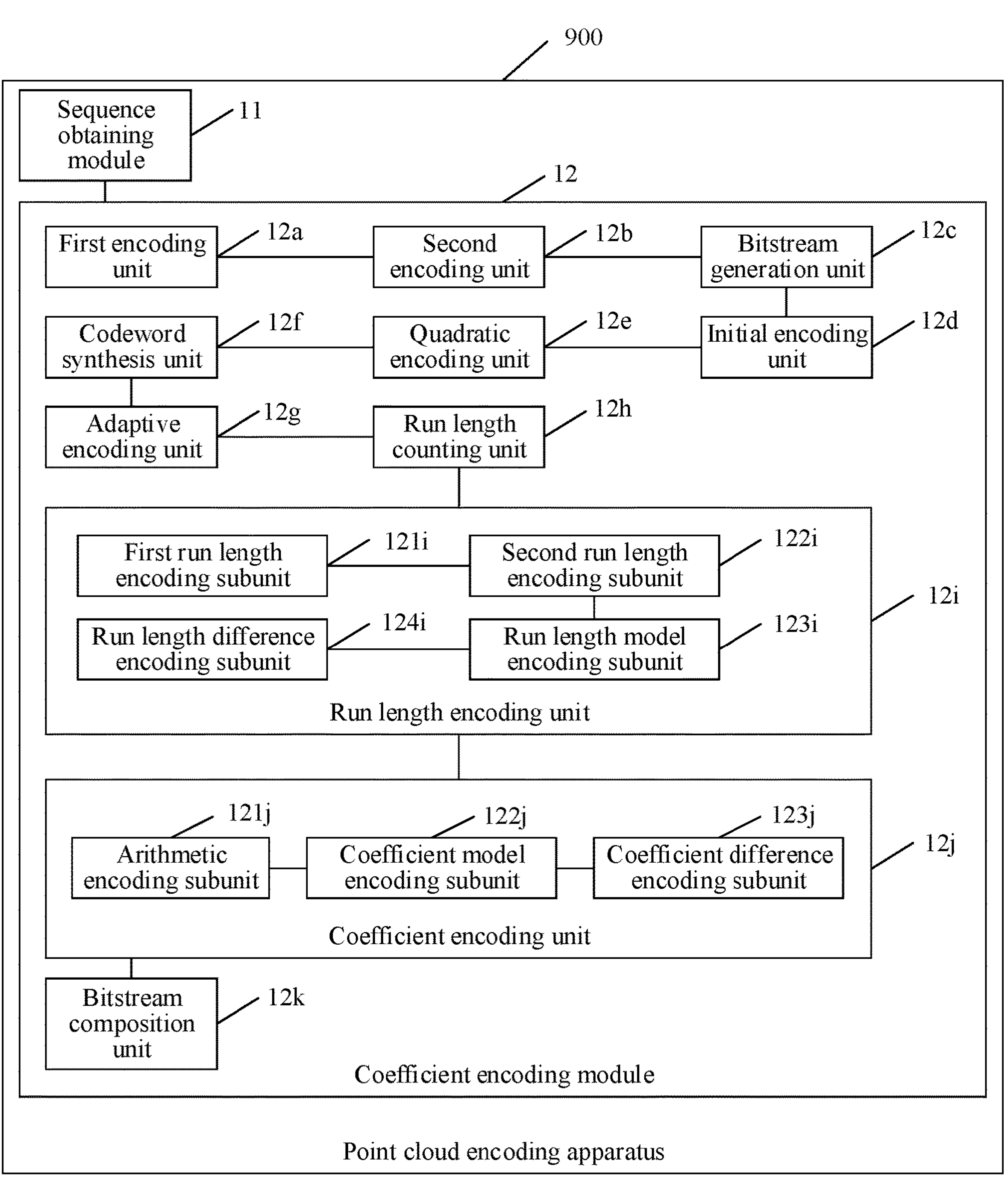
FIG. 9 is a schematic diagram of a point cloud encoding apparatus according to some embodiments of the disclosure.

Further, FIG. 9 is a schematic diagram of a point cloud encoding apparatus according to some embodiments of the disclosure. The point cloud encoding apparatus may be a computer-readable instruction (including program code and the like) run on a computer device. For example, the point cloud encoding apparatus may be application software, and the apparatus may be configured to perform corresponding operations in the method provided in the embodiments of the disclosure. As shown in FIG. 9, the point cloud encoding apparatus 900 may be configured in the computer device in the embodiment corresponding to FIG. 3. Specifically, the apparatus may include: a sequence obtaining module 11 and a coefficient encoding module 12.

The sequence obtaining module 11 may be configured to obtain a to-be-encoded transform coefficient sequence of to-be-encoded point cloud points included in a to-be-encoded point cloud group based on encoding limit information, where the encoding limit information may include a group quantity limit threshold, where a quantity of to-be-encoded point cloud groups may be less than or equal to the group quantity limit threshold, and where the to-be-encoded transform coefficient sequence may be obtained by sorting transform coefficients of the to-be-encoded point cloud points included in the to-be-encoded point cloud group.

The coefficient encoding module 12 may be configured to encode the to-be-encoded transform coefficient sequence to obtain a point cloud group bitstream corresponding to the to-be-encoded point cloud group.

The encoding limit information may include a cache limit threshold and a point cloud group size threshold, where the group quantity limit threshold may be obtained based on the cache limit threshold and the point cloud group size threshold.

The group quantity limit threshold may be determined based on a grouping manner of point cloud groups, and the grouping manner may include: a grouping manner based on a point cloud group size threshold; a grouping manner based on moving sequences obtained through respectively shifting coordinate codewords of k point cloud points, K being a positive integer; or a grouping manner based on a default group quantity.

The transform coefficients of the to-be-encoded point cloud points included in the to-be-encoded point cloud group may include a first transform coefficient and a second transform coefficient; where the to-be-encoded transform coefficient sequence may include a first coefficient subsequence and a second coefficient subsequence; where a transform coefficient included in the first coefficient subsequence may be the first transform coefficient and may be consecutive in the transform coefficient sequence; and where a transform coefficient included in the second coefficient subsequence may be the second transform coefficient and may be consecutive in the transform coefficient sequence.

The transform coefficients of the to-be-encoded point cloud points included in the to-be-encoded point cloud group may include a first transform coefficient and a second transform coefficient; where a transform coefficient adjacent to the first transform coefficient in the to-be-encoded transform coefficient sequence may be the second transform coefficient, and where a transform coefficient adjacent to the second transform coefficient in the to-be-encoded transform coefficient sequence may be the first transform coefficient.

Attribute parameter of the to-be-encoded point cloud points included in the to-be-encoded point cloud group may include b attribute components, b being a positive integer; where the transform coefficients of the to-be-encoded point cloud points may include first transform coefficients corresponding to the b attribute components of the to-be-encoded point cloud points, and second transform coefficients corresponding to the b attribute components.

The to-be-encoded transform coefficient sequence may include coefficient subsequences corresponding to the b attribute components, where a coefficient subsequence may include a first transform coefficient and a second transform coefficient of a corresponding attribute component.

Attribute parameters of to-be-encoded point cloud points included in a to-be-encoded point cloud group may include b attribute components, b being a positive integer; where transform coefficients of the to-be-encoded point cloud points may include first transform coefficients corresponding to the b attribute components of the to-be-encoded point cloud points, and second transform coefficients corresponding to the b attribute components.

The first transform coefficients corresponding to the b attribute components may be consecutive in the to-be-encoded transform coefficient sequence, and the second transform coefficients corresponding to the b attribute components may be consecutive in the to-be-encoded transform coefficient sequence.

Attribute parameters of to-be-encoded point cloud points included in a to-be-encoded point cloud group may include b attribute components, b being a positive integer; where transform coefficients of the to-be-encoded point cloud points may include first transform coefficients corresponding to the b attribute components of the to-be-encoded point cloud points, and second transform coefficients corresponding to the b attribute components.

The to-be-encoded transform coefficient sequence may include a first hybrid subsequence and a second hybrid subsequence.

The first hybrid subsequence may include the first transform coefficients corresponding to the b attribute components of the to-be-encoded point cloud points; where first transform coefficients of associated attribute components of a same to-be-encoded point cloud point in the first hybrid subsequence may be adjacent, and the associated attribute components may be at least two attribute components whose similarities are greater than a component similarity threshold, or at least two attribute components that are associated by default; and where first transform coefficients of remaining attribute components of different to-be-encoded point cloud points in the first hybrid subsequence may be consecutive, and the remaining attribute components may be attribute components other than the associated attribute components in the b attribute components.

The second hybrid subsequence may include the second transform coefficients corresponding to the b attribute components of the to-be-encoded point cloud points, where second transform coefficients of the b attribute components of a same to-be-encoded point cloud point in the second hybrid subsequence may be adjacent in sequence.

Attribute parameters of to-be-encoded point cloud points included in a to-be-encoded point cloud group may include b attribute components, b being a positive integer; where transform coefficients of the to-be-encoded point cloud points may include first transform coefficients corresponding to the b attribute components of the to-be-encoded point cloud points, and second transform coefficients corresponding to the b attribute components.

The to-be-encoded transform coefficient sequence may include a third hybrid subsequence and a fourth hybrid subsequence.

The third hybrid subsequence may include the first transform coefficients corresponding to the b attribute components of the to-be-encoded point cloud points; where first transform coefficients of associated attribute components of a same to-be-encoded point cloud point in the third hybrid subsequence may be adjacent, and the associated attribute components may be at least two attribute components whose similarities are greater than a component similarity threshold; and where first transform coefficients of remaining attribute components of different to-be-encoded point cloud points in the third hybrid subsequence may be consecutive, and the remaining attribute components may be attribute components other than the associated attribute components in the b attribute components.

The fourth hybrid subsequence may include the second transform coefficients corresponding to the b attribute components of the to-be-encoded point cloud points; where second transform coefficients of associated attribute components of a same to-be-encoded point cloud point in the fourth hybrid subsequence may be adjacent, and second transform coefficients of remaining attribute components of different to-be-encoded point cloud points in the fourth hybrid subsequence may be consecutive.

The to-be-encoded point cloud points included in the to-be-encoded point cloud group may include at least two attribute parameters; where the transform coefficients of the to-be-encoded point cloud points included in the to-be-encoded point cloud group may include first transform coefficients of the at least two attribute parameters, and second transform coefficients of the at least two attribute parameters.

In the to-be-encoded transform coefficient sequence, a first transform coefficient and a second transform coefficient parameter under a same attribute may be consecutive, where first transform coefficients under different attribute parameters may be inconsecutive, and second transform coefficients under the different attribute parameters may be inconsecutive.

The to-be-encoded transform coefficient sequence may includes F transform coefficients, where the F transform coefficients may include $F_1$ first transform coefficients and $F_2$ second transform coefficients; F being a positive integer, $F_1$ being a positive integer less than or equal to F, and $F_2$ being a positive integer less than or equal to F.

The coefficient encoding module 12 may include a first encoding unit 12*a*, a second encoding unit 12*b*, and a bitstream generation unit 12*c*.

The first encoding unit 12*a* may be configured to perform, in a case that an $i^{th}$ transform coefficient in the F transform coefficients is a second transform coefficient, encoding processing on the $i^{th}$ transform coefficient to obtain an encoded codeword of the $i^{th}$ transform coefficient, i being a positive integer less than or equal to F.

The second encoding unit 12*b* may be configured to determine, in a case that the $i^{th}$ transform coefficient is a first transform coefficient, a first transform coefficient in the F transform coefficients as a first coefficient predicted value, determine a first coefficient residual of the $i^{th}$ transform coefficient based on the first coefficient predicted value, and perform encoding processing on the first coefficient residual to obtain the encoded codeword of the $i^{th}$ transform coefficient.

The bitstream generation unit 12*c* may be configured to use, in a case that i is F, encoded codewords corresponding to the F transform coefficients to form the point cloud group bitstream corresponding to the to-be-encoded point cloud group.

The to-be-encoded transform coefficient sequence may include F transform coefficients, where the F transform coefficients may include $F_1$ first transform coefficients and $F_2$ second transform coefficients; F being a positive integer, $F_1$ being a positive integer less than or equal to F, and $F_2$ being a positive integer less than or equal to F.

The first encoding unit 12*a* may be further configured to perform, in a case that an $i^{th}$ transform coefficient in the F transform coefficients is a second transform coefficient, encoding processing on the $i^{th}$ transform coefficient to obtain an encoded codeword of the $i^{th}$ transform coefficient, i being a positive integer less than or equal to F.

The second encoding unit 12*b* may be further configured to obtain a second coefficient predicted value of the $i^{th}$ transform coefficient in a case that the $i^{th}$ transform coefficient is a first transform coefficient, determine a second coefficient residual of the $i^{th}$ transform coefficient based on the second coefficient predicted value, and perform encoding processing on the second coefficient residual to obtain the encoded codeword of the $i^{th}$ transform coefficient, the second coefficient predicted value of the $i^{th}$ transform coefficient being a first transform coefficient that has a closest sequence distance to the $i^{th}$ transform coefficient in first transform coefficients located before the $i^{th}$ transform coefficient.

The bitstream generation unit 12*c* may be further configured to use, in a case that i is F, encoded codewords corresponding to the F transform coefficients to form the point cloud group bitstream corresponding to the to-be-encoded point cloud group.

The to-be-encoded transform coefficient sequence may include F transform coefficients, where the F transform coefficients may include $F_1$ first transform coefficients and $F_2$ second transform coefficients; F being a positive integer, $F_1$ being a positive integer less than or equal to F, and $F_2$ being a positive integer less than or equal to F.

The coefficient encoding module 12 may further include an initial encoding unit 12*d*, a secondary encoding unit 12*e*, a codeword synthesis unit 12*f*, an adaptive encoding unit 12*g*, a run length counting unit 12*h*, a run length encoding unit 12*i*, a coefficient encoding unit 12*j*, and a bitstream forming unit 12*k*.

The initial encoding unit 12*d* may be configured to perform entropy encoding on the F transform coefficients in the to-be-encoded transform coefficient sequence, to obtain initial codewords corresponding to the F transform coefficients.

The secondary encoding unit 12*e* may be configured to perform secondary encoding on the $F_1$ first transform coefficients in the F transform coefficients, to obtain re-encoded codewords corresponding to the $F_1$ first transform coefficients.

The codeword synthesis unit **12*f*** may be configured to use the re-encoded codewords corresponding to the $F_1$ first transform coefficients and initial codewords corresponding to the $F_2$ second transform coefficients to form the point cloud group bitstream corresponding to the to-be-encoded point cloud group.

The adaptive encoding unit **12*g*** may be configured to encode the to-be-encoded transform coefficient sequence by using context-based adaptive binary arithmetic coding, to obtain the point cloud group bitstream corresponding to the to-be-encoded point cloud group.

The run length counting unit **12*h*** may be configured to count a $j^{th}$ run length in the to-be-encoded transform coefficient sequence.

The run length encoding unit **12*i*** may be configured to encode the $j^{th}$ run length to obtain a $j^{th}$ run length codeword, j being a positive integer.

The coefficient encoding unit **12*j*** may be configured to encode a $j^{th}$ coefficient value to obtain a $j^{th}$ coefficient codeword, the $j^{th}$ coefficient value being, in the to-be-encoded transform coefficient, a character that is located after a character indicated by the $j^{th}$ run length and that is adjacent to the character indicated by the $j^{th}$ run length.

The bitstream forming unit **12*k*** may be configured to use the obtained run length codeword and coefficient codeword to form the point cloud group bitstream corresponding to the to-be-encoded point cloud group in a case that encoding of the to-be-encoded transform coefficient sequence is completed.

The encoding limit information may further include the cache limit threshold.

The run length encoding unit **12*i* may include a first run length encoding subunit 121*i*, a second run length encoding subunit 122*i*, a run length model encoding subunit 123*i*, and a run length difference encoding subunit 124*i***.

The first run length encoding subunit **121*i*** may be configured to determine, in a case that the $j^{th}$ run length is a first run length obtained in the first transform coefficient, a quantity of first encoding bits used for encoding the first run length based on the group quantity limit threshold, and use the quantity of first encoding bits to encode the $j^{th}$ run length to obtain the $j^{th}$ run length codeword corresponding to the $j^{th}$ run length.

The second run length encoding subunit **122*i*** may be configured to determine, in a case that the $j^{th}$ run length is a second run length obtained in the second transform coefficient, a quantity of second encoding bits used for encoding the second run length based on a difference between the cache limit threshold and the group quantity limit threshold, and use the quantity of second encoding bits to encode the $j^{th}$ run length to obtain the $j^{th}$ run length codeword corresponding to the $j^{th}$ run length.

The $j^{th}$ run length may be L, L being a natural number.

The run length model encoding subunit **123*i*** may be configured to obtain N context models; and in a case that the $j^{th}$ run length is any one of model values corresponding to the N context models, encode a model value corresponding to the $j^{th}$ run length in the N context models to obtain the $j^{th}$ run length codeword corresponding to the $j^{th}$ run length, and update the N context models, N being a natural number.

The run length difference encoding subunit **124*i*** may be configured to perform, in a case that the $j^{th}$ run length is not the model values corresponding to the N context models, entropy encoding on (L−N) to obtain the $j^{th}$ run length codeword.

The coefficient encoding unit **12*j* may include an arithmetic encoding subunit 121*j*, and a coefficient model encoding subunit 122*j* or a coefficient difference encoding subunit 123*j***.

The arithmetic encoding subunit **121*j*** may be configured to encode the $j^{th}$ coefficient value by using context-based adaptive binary arithmetic coding, to obtain the $j^{th}$ coefficient codeword.

The $j^{th}$ coefficient value may be C, C being a natural number.

The coefficient model encoding subunit **122*j*** may be configured to obtain P context models; and in a case that the $j^{th}$ coefficient value is any one of model values corresponding to the P context models, encode a model value corresponding to the $j^{th}$ coefficient value in the P context models to obtain a $j^{th}$ coefficient codeword corresponding to the $j^{th}$ coefficient value, and update the P context models, P being a natural number.

The coefficient difference encoding subunit **123*j*** may be configured to perform, in a case that the $j^{th}$ coefficient value is not model values corresponding to the P context models, entropy encoding on (C−P) to obtain a $j^{th}$ coefficient codeword.

Figure 10:
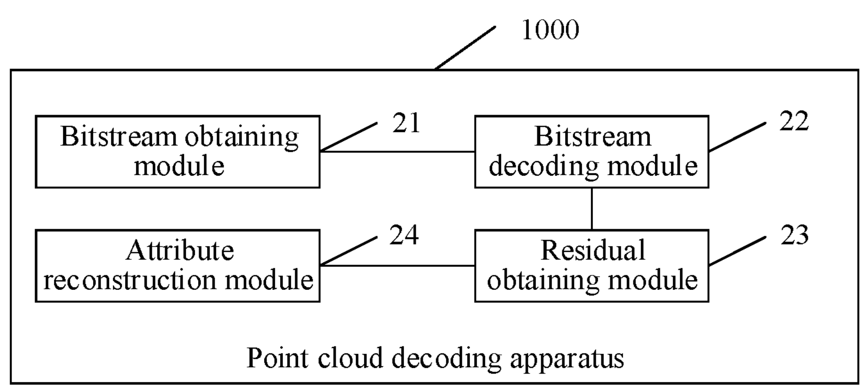
FIG. 10 is a schematic diagram of a point cloud decoding apparatus according to some embodiments of the disclosure.

Further, FIG. 10 is a schematic diagram of a point cloud decoding apparatus according to some embodiments of the disclosure. The point cloud decoding apparatus may be a computer-readable instruction (including program code and the like) run on a computer device. For example, the point cloud decoding apparatus may be application software, and the apparatus may be configured to perform corresponding operations in the method provided in the embodiments of the disclosure. As shown in FIG. 10, the point cloud decoding apparatus 1000 may be configured in the computer device in the embodiment corresponding to FIG. 5. Specifically, the apparatus may include: a bitstream obtaining module 21 and a bitstream decoding module 22.

The bitstream obtaining module 21 may be configured to obtain a point cloud group bitstream, where the point cloud group bitstream may be used for representing an encoded bitstream of a to-be-decoded point cloud group, and where a quantity of to-be-decoded point cloud groups may be less than or equal to a group quantity limit threshold in encoding limit information.

The bitstream decoding module 22 may be configured to decode the point cloud group bitstream, to obtain a transform coefficient corresponding to the to-be-decoded point cloud group.

The apparatus may further include a residual obtaining module 23 and an attribute reconstruction module 24.

The residual obtaining module 23 may be configured to perform inverse transformation on the transform coefficient corresponding to the to-be-decoded point cloud group, to obtain attribute residuals of to-be-decoded point cloud points included in the to-be-decoded point cloud group.

The attribute reconstruction module 24 may be configured to reconstruct the to-be-decoded point cloud points based on the attribute residuals of the to-be-decoded point cloud points, to obtain attribute reconstruction values of the to-be-decoded point cloud points.

Figure 11:
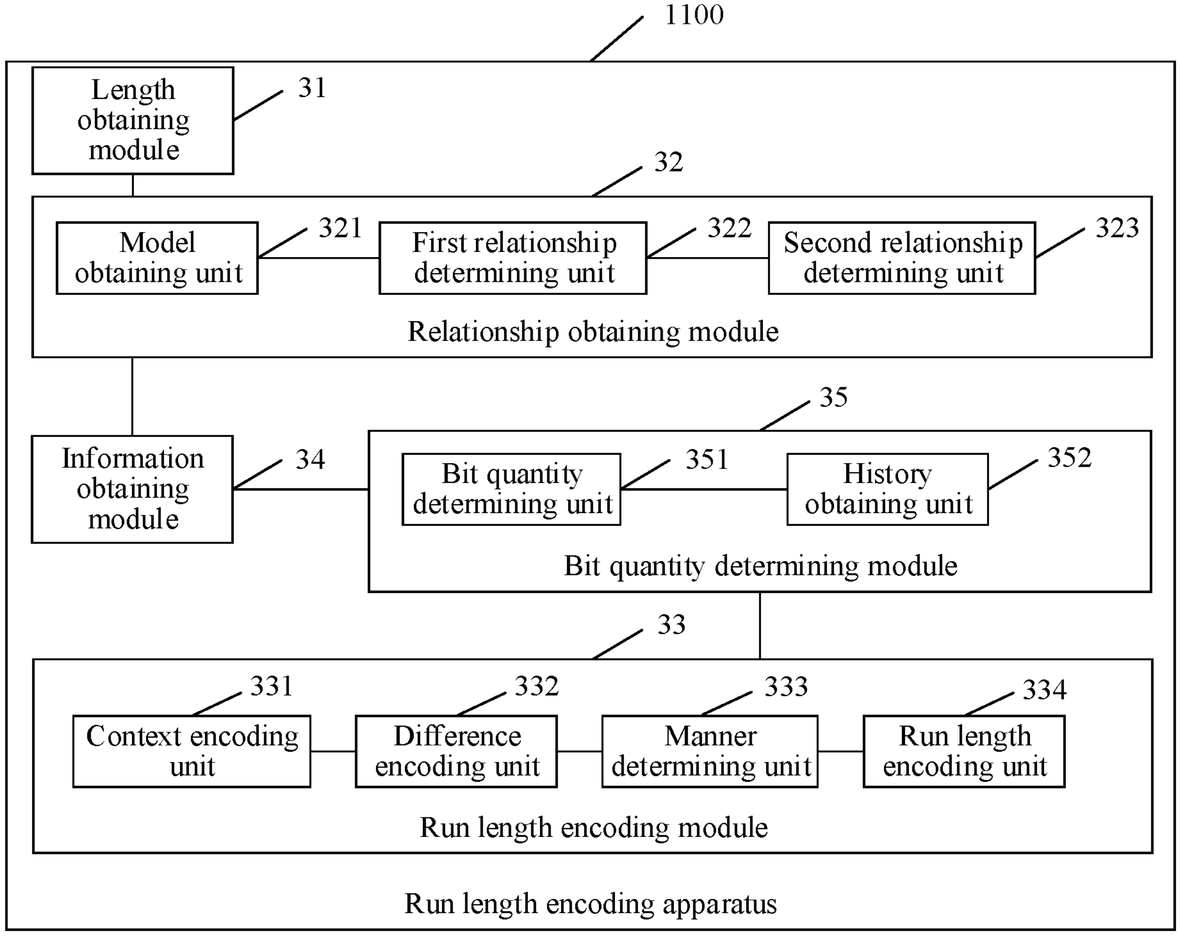
FIG. 11 is a schematic diagram of a run length encoding apparatus according to some embodiments of the disclosure.

Further, FIG. 11 is a schematic diagram of a run length encoding apparatus according to some embodiments of the disclosure. The run length encoding apparatus may be a computer-readable instruction (including program code and the like) run on a computer device. For example, the run length encoding apparatus may be application software, and the apparatus may be configured to perform corresponding operations in the method provided in the embodiments of the disclosure. As shown in FIG. 11, the run length encoding apparatus 1100 may be configured in the computer device in the embodiment corresponding to FIG. 6. Specifically, the apparatus may include: a length obtaining module 31, a relationship obtaining module 32, and a run length encoding module 33.

The length obtaining module 31 may be configured to obtain a run length of point cloud data.

The relationship obtaining module 32 may be configured to determine a correspondence between the run length and a model value of a context model, the context model being determined based on pre-obtained encoding limit information.

The run length encoding module 33 may be configured to determine a run length encoding manner used for encoding the run length based on the correspondence, and encode the run length based on the run length encoding manner.

The relationship obtaining module 32 may include a model obtaining unit 321, a first relationship determining unit 322, or a second relationship determining unit 323.

The model obtaining unit 321 may be configured to obtain N context models used for encoding the run length, N being a natural number.

The first relationship determining unit 322 may be configured to determine, in a case that the run length is any one of model values corresponding to the N context models, a correspondence between the run length and the model values of the N context models as a first correspondence.

The second relationship determining unit 323 may be configured to determine, in a case that the run length is not any one of the model values corresponding to the N context models, a correspondence between the run length and the model values of the N context models as a second correspondence.

The run length may be L, L being a natural number.

The run length encoding module 33 may include a context encoding unit 331, or a difference encoding unit 332.

The context encoding unit 331 may be configured to determine, in a case that the correspondence is the first correspondence, that a run length encoding manner used for encoding the run length is a context model encoding manner, encode the model values corresponding to the run length in the N context models based on the context model encoding manner, and update the N context models.

The difference encoding unit 332 may be configured to determine, in a case that the correspondence is the second correspondence, that a run length encoding manner used for encoding the run length is a difference encoding manner, and perform entropy encoding on (L−N) based on the difference encoding manner.

The apparatus 1100 may further include an information obtaining module 34 and a bit quantity determining module 35.

The information obtaining module 34 may be configured to obtain encoding limit information.

The bit quantity determining module 35 may be configured to determine a quantity of encoding bits used for encoding the run length based on the encoding limit information.

The information obtaining module 34 may be further configured to obtain a context model used for encoding the run length based on the encoding limit information.

The run length encoding module 33 may further include a manner determining unit 333 and a run length encoding unit 334.

The manner determining unit 333 may be configured to determine a run length encoding manner used for encoding the run length based on the correspondence.

The run length encoding unit 334 may be configured to encode the run length based on the run length encoding manner and a quantity of encoding bits corresponding to the run length.

The encoding limit information may include a group quantity limit threshold and/or a cache limit threshold.

The bit quantity determining module 35 may include a bit quantity determining unit 351 and a history obtaining unit 352.

The bit quantity determining unit 351 may be configured to determine a logarithm of the group quantity limit threshold as the quantity of encoding bits used for encoding the run length; or may be configured to determine a logarithm of a difference between the cache limit threshold and the group quantity limit threshold as the quantity of encoding bits used for encoding the run length.

The encoding limit information may include a group quantity limit threshold.

The bit quantity determining module 35 may further include a history obtaining unit 352.

The history obtaining unit 352 may be configured to obtain a historical run length obtained under the group quantity limit threshold.

The bit quantity determining unit 351 may be further configured to determine the quantity of encoding bits used for encoding the run length based on a numerical distribution of the historical run length.

Figure 12:
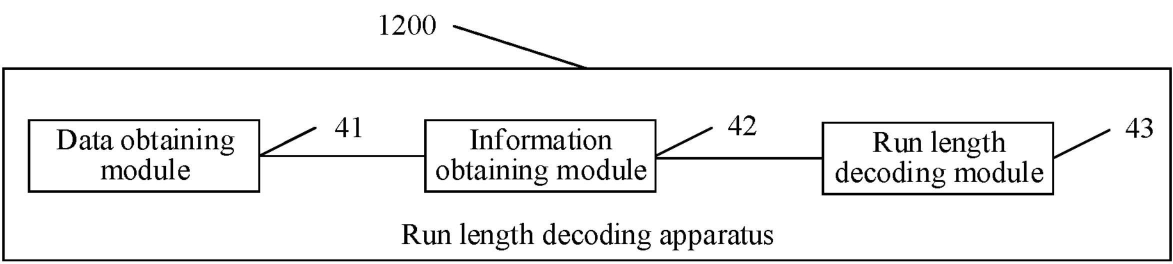
FIG. 12 is a schematic diagram of a run length decoding apparatus according to some embodiments of the disclosure.

Further, FIG. 12 is a schematic diagram of a run length decoding apparatus according to some embodiments of the disclosure. The run length decoding apparatus may be a computer-readable instruction (including program code and the like) run on a computer device. For example, the run length decoding apparatus may be application software, and the apparatus may be configured to perform corresponding operations in the method provided in the embodiments of the disclosure. As shown in FIG. 12, the run length decoding apparatus 1200 may be configured in the computer device in the embodiment corresponding to FIG. 7. Specifically, the apparatus may include: a data obtaining module 41, an information obtaining module 42, and a run length decoding module 43.

The data obtaining module 41 may be configured to obtain a run length codeword.

The information obtaining module 42 may be configured to obtain encoding limit information.

The data obtaining module 41 may be further configured to obtain a context model used for run length decoding of the run length codeword based on the encoding limit information; and the run length decoding module 43 may be configured to decode the run length codeword by using the context model, the run length codeword being decoded in a case that a value obtained by decoding the context model is different from a model value of the context model for decoding.

The embodiments of the disclosure provide a point cloud encoding and decoding apparatus, and the apparatus may obtain a to-be-encoded transform coefficient sequence of to-be-encoded point cloud points included in a to-be-encoded point cloud group based on encoding limit information, where the encoding limit information may include a group quantity limit threshold, where a quantity of to-be-encoded point cloud groups may be less than or equal to the group quantity limit threshold, and where the to-be-encoded transform coefficient sequence may be obtained by sorting transform coefficients of the to-be-encoded point cloud points included in the to-be-encoded point cloud group. The to-be-encoded transform coefficient sequence may be encoded to obtain a point cloud group bitstream corresponding to the to-be-encoded point cloud group. In addition, a decoding process may be performed based on the encoding limit information, so that when an abnormality occurs in an encoding and decoding process, an impact on the overall encoding and decoding process may be less, and fault tolerance of encoding and decoding may be improved. In addition, limit on encoding and decoding may be performed based on encoding limit information, spatial random access of point clouds may be implemented, and rapid decoding and reconstruction of part of point clouds may be further enabled, thereby improving encoding and decoding performance and encoding and decoding efficiency.

Figure 13:
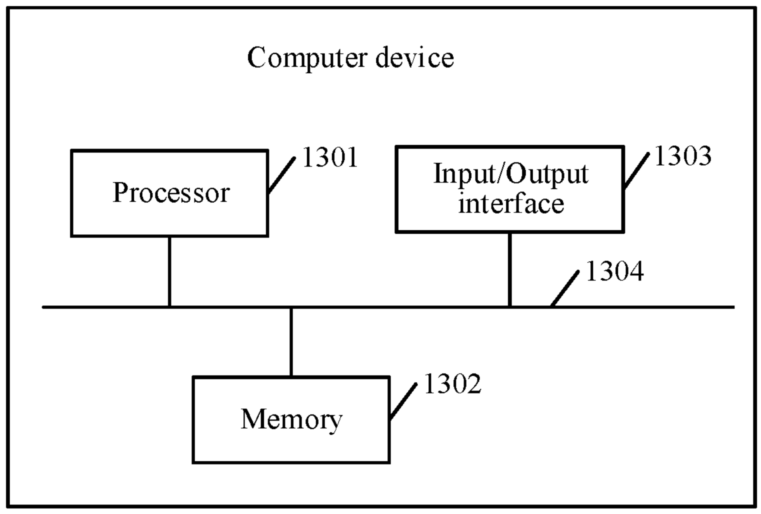
FIG. 13 is a schematic diagram of a computer device according to some embodiments of the disclosure.

FIG. 13 is a schematic diagram of a computer device according to some embodiments of the disclosure. As shown in FIG. 13, the computer device in this embodiment of the disclosure may include: one or more processors 1301, a memory 1302, and an input/output interface 1303. The processor 1301, the memory 1302, and the input/output interface 1303 may be connected through a bus 1304. The memory 1302 may be configured to store computer-readable instructions, where the computer-readable instructions may include program instructions, and the input/output interface 1303 may be configured to perform data interaction; and the processor 1301 may be configured to perform program instructions stored in the memory 1302.

The processor 1301 may perform the following operations when performing point cloud encoding: obtaining a to-be-encoded transform coefficient sequence of to-be-encoded point cloud points included in a to-be-encoded point cloud group based on encoding limit information, where the encoding limit information may include a group quantity limit threshold, where a quantity of to-be-encoded point cloud groups may be less than or equal to the group quantity limit threshold, and where the to-be-encoded transform coefficient sequence may be obtained by sorting transform coefficients of the to-be-encoded point cloud points included in the to-be-encoded point cloud group. The to-be-encoded transform coefficient sequence may be encoded to obtain a point cloud group bitstream corresponding to the to-be-encoded point cloud group.

The processor 1301 may perform the following operations when performing point cloud decoding: obtaining a point cloud group bitstream, where the point cloud group bitstream may be used for representing an encoded bitstream of a to-be-decoded point cloud group, and where a quantity of to-be-decoded point cloud groups may be less than or equal to a group quantity limit threshold in encoding limit information; and decoding the point cloud group bitstream, to obtain a transform coefficient corresponding to the to-be-decoded point cloud group.

The processor 1301 may perform the following operations when performing run length encoding: obtaining a run length, and determining a correspondence between the run length and a model value of a context model; and determining a run length encoding manner used for encoding the run length based on the correspondence, and encoding the run length based on the run length encoding manner.

The processor 1301 may perform the following operations when performing run length decoding: obtaining a run length codeword, and obtaining a context model used for decoding the run length; and decoding the run length codeword by using the context model, the run length codeword may be decoded in a case that a value obtained by decoding the context model is different from a model value of the context model for decoding.

In some feasible implementations, the processor 1301 may be a central processing unit (CPU). The processor may further be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor, or the like.

The memory 1302 may include a read-only memory and a random access memory, and provides the processor 1301 and the input/output interface 1303 with instructions and data. A part of the memory 1302 may further include a non-volatile random access memory. For example, the memory 1302 may further store information about a device type.

In specific implementations, the computer device may perform the implementations provided in the operations in FIG. 3, FIG. 5, FIG. 6, or FIG. 7 through built-in functional modules of the computer device. For details, reference may be made to the implementations provided in the operations in FIG. 3, FIG. 5, FIG. 6, or FIG. 7, and details are not described herein again.

The embodiments of the disclosure provide a computer device, including: one or more processors, an input/output interface, and a memory. Computer-readable instructions in the memory are obtained through the processor, to perform operations of the method shown in FIG. 3, FIG. 5, FIG. 6, or FIG. 7, and perform point cloud encoding and decoding operations. In the embodiments of the disclosure, a to-be-encoded transform coefficient sequence of to-be-encoded point cloud points included in a to-be-encoded point cloud group based on encoding limit information may be obtained, where the encoding limit information may include a group quantity limit threshold, where a quantity of to-be-encoded point cloud groups may be less than or equal to the group quantity limit threshold, and where the to-be-encoded transform coefficient sequence may be obtained by sorting transform coefficients of the to-be-encoded point cloud points included in the to-be-encoded point cloud group. The to-be-encoded transform coefficient sequence may be encoded to obtain a point cloud group bitstream corresponding to the to-be-encoded point cloud group. In addition, a decoding process may be performed based on the encoding limit information, so that when an abnormality occurs in an encoding and decoding process, an impact on the overall encoding and decoding process may be less, and fault tolerance of encoding and decoding may be improved. In addition, limit on encoding and decoding may be performed based on encoding limit information, spatial random access of point clouds may be implemented, and rapid decoding and reconstruction of part of point clouds may be further enabled, thereby improving encoding and decoding performance and encoding and decoding efficiency.

The embodiments of the disclosure further provide one or more computer-readable storage media, the computer-readable storage media storing computer-readable instructions, and the computer-readable instructions being adapted to be loaded and executed by the processor to perform the point cloud encoding and decoding method provided by each operation in FIG. 3, FIG. 5, FIG. 6, or FIG. 7. For a specific implementation, refer to each operation in FIG. 3, FIG. 5, FIG. 6, or FIG. 7. Details are not described herein again. In addition, the description of beneficial effects of the same method is not described herein again. For technical details that are not disclosed in the embodiments of the computer-readable storage medium of the disclosure, refer to the method embodiments of the disclosure. In an example, the computer-readable instructions may be deployed to be executed on a computer device, or deployed to be executed on a plurality of computer devices at the same location, or deployed to be executed on a plurality of computer devices that are distributed in a plurality of locations and interconnected by using a communication network.

The computer-readable storage medium may be a point cloud encoding apparatus provided in any one of the foregoing embodiments or an internal storage unit of the computer device, for example, a hard disk or a main memory of the computer device. The computer-readable storage medium may alternatively be an external storage device of the computer device, for example, a removable hard disk, a smart media card (SMC), a secure digital (SD) card, or a flash card equipped on the computer device. Further, the computer-readable storage medium may further include both an internal storage unit and an external storage device of the computer device. The computer-readable storage medium is configured to store the computer-readable instructions and another program and data that are required by the computer device. The computer-readable storage medium may further be configured to temporarily store data that has been output or data to be output.

The embodiments of the disclosure further provide a computer program product, the computer program product including computer-readable instructions, the computer-readable instructions being stored in one or more computer-readable storage media. One or more processors of the computer device reads the computer instructions from the computer-readable storage medium, and the processor performs the computer instructions, so that the computer device performs the method provided in the various optional implementations in FIG. 3, FIG. 5, FIG. 6, or FIG. 7, and a decoding process is implemented based on the encoding limit information. In this way, when an abnormality occurs in an encoding and decoding process, an impact on the overall encoding and decoding process is less, and fault tolerance of encoding and decoding is improved. In addition, limit on encoding and decoding is performed based on encoding limit information, spatial random access of point clouds may be implemented, and rapid decoding and reconstruction of part of point clouds is further enabled, thereby improving encoding and decoding performance and encoding and decoding efficiency.

In the specification, claims, and accompanying drawings of embodiments of the disclosure, the terms "first" and "second" are intended to distinguish between different objects but do not indicate a particular order. In addition, terminologies "comprise" and any variations thereof are intended to indicate non-exclusive inclusion. For example, a process, method, apparatus, product, or device that includes a series of operations or modules is not limited to the listed operations or units; and instead, further includes a operation or module that is not listed, or further includes another operation or unit that is intrinsic to the process, method, apparatus, product, or device.

A person of ordinary skill in the art may be aware that, in combination with the examples described in the embodiments disclosed in this specification, units and algorithm operations can be implemented by electronic hardware, computer software, or a combination thereof. To clearly describe the interchangeability between the hardware and the software, the foregoing has generally described compositions and operations of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

The method and the related apparatus provided in the embodiments of the disclosure are described with reference to method flowcharts and/or schematic structural diagrams provided in the embodiments of the disclosure. Specifically, computer-readable instructions may be used to implement each process and/or each block in the method flowcharts and/or the schematic structural diagrams and a combination of a process and/or a block in the flowcharts and/or the block diagrams. These computer-readable instructions may be provided to a general-purpose computer, a dedicated computer, an embedded processor, or a processor of another programmable point cloud encoding device to generate a machine, so that the instructions executed by the computer or the processor of the another programmable point cloud encoding device generate an apparatus for implementing a specific function in one or more processes in the flowcharts and/or in one or more blocks in the schematic structural diagrams. These computer-readable instructions may alternatively be stored in a computer-readable memory that can instruct a computer or another programmable point cloud encoding device to work in a specific manner, so that the instructions stored in the computer-readable memory generate an artifact that includes an instruction apparatus. The instruction apparatus implements a specific function in one or more procedures in the flowcharts and/or in one or more blocks in the schematic structural diagrams. These computer-readable instructions may alternatively be loaded onto a computer or another programmable point cloud encoding device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

A sequence of the operations of the method in the embodiments of the disclosure may be adjusted, and certain operations may also be combined or removed according to an actual requirement.

The modules in the apparatus in the embodiments of the disclosure may be combined, divided, and deleted according to an actual requirement.

What is disclosed above is merely exemplary embodiments of the disclosure, and certainly is not intended to limit the protection scope of the disclosure. Therefore, equivalent variations made in accordance with the claims of the disclosure shall fall within the scope of the disclosure.

What is claimed is:

1. A point cloud encoding method, performed by a computer device, the method comprising:

obtaining encoding limit information, wherein the encoding limit information comprises a group quantity limit threshold obtained based on a cache limit threshold and a point cloud group size threshold;

obtaining a transform coefficient sequence of point cloud points based on the encoding limit information, wherein the point cloud points are comprised in a point cloud group, wherein a quantity of the point cloud groups is less than or equal to the group quantity limit threshold, and wherein the transform coefficient sequence is obtained by sorting transform coefficients of the point cloud points; and encoding the transform coefficient sequence to obtain a point cloud group bitstream corresponding to the point cloud group.

2. The method according to claim 1, wherein the group quantity limit threshold is determined based on a grouping manner of point cloud groups, and wherein the grouping manner comprises at least one of the following manners:

a grouping manner based on a point cloud group size threshold;

a grouping manner based on moving sequences obtained through respectively shifting coordinate codewords of k point cloud points, K being a positive integer; and a grouping manner based on a default group quantity.

3. The method according to claim 1, wherein the transform coefficients of the point cloud points are sorted to obtain the transform coefficient sequence based on an order of the transform coefficients.

4. The method according to claim 1, wherein the transform coefficients of the point cloud points are sorted to obtain the transform coefficient sequence based on one or more attribute parameters of the point cloud points.

5. The method of claim 1, wherein the transform coefficient sequence is encoded to obtain the point cloud group bitstream based on a coefficient residual of a transform coefficient in the transform coefficient sequence.

6. The method of claim 1, wherein the transform coefficient sequence is encoded to obtain the point cloud group bitstream using entropy encoding.

7. The method of claim 1, wherein the transform coefficient sequence is encoded to obtain the point cloud group bitstream using context-based adaptive binary arithmetic coding.

8. The method of claim 1, wherein the transform coefficient sequence is encoded to obtain the point cloud group bitstream based on run lengths in the transform coefficient sequence.

9. The method of claim 8, wherein the transform coefficient sequence is encoded to obtain the point cloud group bitstream further based on one of: the cache limit threshold and the group quantity limit threshold; and context models.

10. A point cloud encoding apparatus comprising:

at least one memory containing program code; and at least one processor configured to execute the program code, the program code comprising:

first obtaining code configured to cause the at least one processor to obtain encoding limit information, wherein the encoding limit information comprises a group quantity limit threshold obtained based on a cache limit threshold and a point cloud group size threshold;

second obtaining code configured to cause the at least one processor to obtain a transform coefficient sequence of point cloud points based on the encoding limit information, wherein the point cloud points are comprised in a point cloud group, wherein a quantity of point cloud groups is less than or equal to the group quantity limit threshold, and wherein the transform coefficient sequence is obtained by sorting transform coefficients of the point cloud points; and first encoding code configured to cause the at least one processor to encode the transform coefficient sequence to obtain a point cloud group bitstream corresponding to the point cloud group.

11. The apparatus according to claim 10, wherein the group quantity limit threshold is determined based on a grouping manner of point cloud groups, and wherein the grouping manner comprises at least one of the following manners:

a grouping manner based on a point cloud group size threshold;

a grouping manner based on moving sequences obtained through respectively shifting coordinate codewords of k point cloud points, K being a positive integer; and a grouping manner based on a default group quantity.

12. The apparatus according to claim 10, wherein the transform coefficients of the point cloud points are sorted to obtain the transform coefficient sequence based on an order of the transform coefficients.

13. The apparatus according to claim 10, wherein the transform coefficients of the point cloud points are sorted to obtain the transform coefficient sequence based on one or more attribute parameters of the point cloud points.

14. The apparatus of claim 10, wherein the transform coefficient sequence is encoded to obtain the point cloud group bitstream based on a coefficient residual of a transform coefficient in the transform coefficient sequence.

15. The apparatus of claim 10, wherein the transform coefficient sequence is encoded to obtain the point cloud group bitstream using entropy encoding.

16. The apparatus of claim 10, wherein the transform coefficient sequence is encoded to obtain the point cloud group bitstream using context-based adaptive binary arithmetic coding.

17. The apparatus of claim 10, wherein the transform coefficient sequence is encoded to obtain the point cloud group bitstream based on run lengths in the transform coefficient sequence.

18. A non-transitory computer-readable medium containing program code that when executed by at least one processor, causes the at least one processor to:

obtain encoding limit information, wherein the encoding limit information comprises a group quantity limit threshold obtained based on a cache limit threshold and a point cloud group size threshold;

obtain a transform coefficient sequence of point cloud points based on the encoding limit information, wherein the point cloud points are comprised in a point cloud group, wherein a quantity of point cloud groups is less than or equal to the group quantity limit threshold, and wherein the transform coefficient sequence is obtained by sorting transform coefficients of the point cloud points; and encode the transform coefficient sequence to obtain a point cloud group bitstream corresponding to the point cloud group.

* * * * *